US012801153B2

(12) United States Patent
Raviv et al.

(10) Patent No.: US 12,801,153 B2
(45) Date of Patent: Nov. 17, 2026

(54) FUEL CONSUMPTION OPTIMIZATION

(71) Applicant: ORCA AI LTD, Tel Aviv (IL)

(72) Inventors: Dor Raviv, Tel Aviv (IL); Yael Lubratzki, Binyamina (IL)

(73) Assignee: ORCA AI LTD, Tel Aviv (IL)

( * ) Notice: Subject to any disclaimer, the term of this patent is extended or adjusted under 35 U.S.C. 154(b) by 0 days.

(21) Appl. No.: 19/014,774

(22) Filed: Jan. 9, 2025

(65) Prior Publication Data

US 2026/0194909 A1 Jul. 9, 2026

(51) Int. Cl.
*B63B 79/40* (2020.01)
*B63B 43/00* (2006.01)
(Continued)

(52) U.S. Cl.
CPC ............. *G05D 1/622* (2024.01); *B63B 43/00* (2013.01); *B63B 79/15* (2020.01); *B63B 79/40* (2020.01);
(Continued)

(58) Field of Classification Search
CPC .... G05D 1/622; G05D 1/644; G05D 2109/34; G05D 2107/27
See application file for complete search history.

(56) References Cited

U.S. PATENT DOCUMENTS

2007/0078575 A1* 4/2007 Wilson .................... B63B 79/40 701/21
2010/0168942 A1* 7/2010 Noffsinger ............. G01C 21/20 715/764

(Continued)

FOREIGN PATENT DOCUMENTS

CN 117232520 A 12/2023
EP 3 633 318 B1 8/2021

(Continued)

OTHER PUBLICATIONS

Durlik et al., "Artificial Intelligence in Maritime Transportation: A Comprehensive Review of Safety and Risk Management Applications", Applied Sciences, Sep. 19, 2024, vol. 14, No. 18, 8420, 32 pages. https://doi.org/10.3390/app14188420.

(Continued)

*Primary Examiner* — Matthew J. Reda

(74) *Attorney, Agent, or Firm* — Whitestone Law, PLLC

(57) ABSTRACT

A system for improving fuel consumption of a marine vessel, comprising at least one processor and a memory including computer program code, with the at least memory and the computer program code being configured with the at least one processor to cause the system to: obtain safety information indicative of an increased likelihood for collision of the vessel with another maritime object; process current navigational data of the vessel in view of the safety information to generate a set of possible deviation maneuvering schemes with respect to the other object which qualify a collision prevention safety criterion; perform fuel consumption analysis for the set of possible deviation maneuvering schemes to assess fuel consumption in different possible deviation maneuvering schemes; and compute a recommended deviation scheme for the vessel based on results of the analysis, to reduce fuel consumption of the vessel in maneuvering with respect to the other object.

14 Claims, 9 Drawing Sheets

(51) Int. Cl.

| | |
|---|---|
| ***B63B 79/15*** | (2020.01) |
| ***G05D 1/622*** | (2024.01) |
| ***G05D 1/644*** | (2024.01) |
| *G05D 107/00* | (2024.01) |
| *G05D 109/30* | (2024.01) |

(52) U.S. Cl.
CPC ......... *G05D 1/644* (2024.01); *G05D 2107/27* (2024.01); *G05D 2109/34* (2024.01)

(56) References Cited

U.S. PATENT DOCUMENTS

| | | | |
|---|---|---|---|
| 2012/0259489 A1 | 10/2012 | Hamamatsu et al. | |
| 2014/0370764 A1* | 12/2014 | Kuriyagawa .......... | B63H 20/12 440/1 |
| 2017/0076616 A1* | 3/2017 | Kanade .................... | G08G 5/80 |
| 2019/0164451 A1 | 5/2019 | Gaither et al. | |
| 2020/0105143 A1* | 4/2020 | Ramstrum, Jr. ... | G01C 21/3807 |
| 2021/0114698 A1* | 4/2021 | Moon ..................... | B63B 49/00 |
| 2021/0125502 A1* | 4/2021 | Mansor .................. | G05D 1/693 |
| 2021/0156692 A1* | 5/2021 | Moriwaki ............... | B63B 79/15 |
| 2021/0348926 A1* | 11/2021 | Dokken .................. | B63B 79/20 |
| 2021/0387706 A1 | 12/2021 | Siganos et al. | |
| 2022/0253763 A1 | 8/2022 | Dividino et al. | |
| 2023/0152092 A1* | 5/2023 | Pan ...................... | G01C 21/203 73/170.31 |
| 2024/0144831 A1* | 5/2024 | Hamada ................. | B63H 21/21 |
| 2025/0065996 A1* | 2/2025 | Ko .......................... | B63B 79/40 |

FOREIGN PATENT DOCUMENTS

| | | |
|---|---|---|
| KR | 101937439 B1 | 1/2019 |
| WO | 2024144365 A1 | 7/2024 |

OTHER PUBLICATIONS

Md Shadab Alam et al., "AI on the Water: Applying DRL to Autonomous Vessel Navigation", ArXiv, Electrical Engineering and Systems Science > Systems and Control, 2023, arXiv:2310.14938, 10 pages. https://doi.org/10.48550/arXiv.2310.14938.

Kontzinos et al.,2022. State-Of-The-Art Analysis of Artificial Intelligence Approaches in the Maritime Industry, Proceedings of the IADIS International Conference on Applied Computing Proceedings of the IADIS International Conference on WWW/Internet, Nov. 2022, pp. 222-226. ISBN: 978-989-8704-44-3.

* cited by examiner

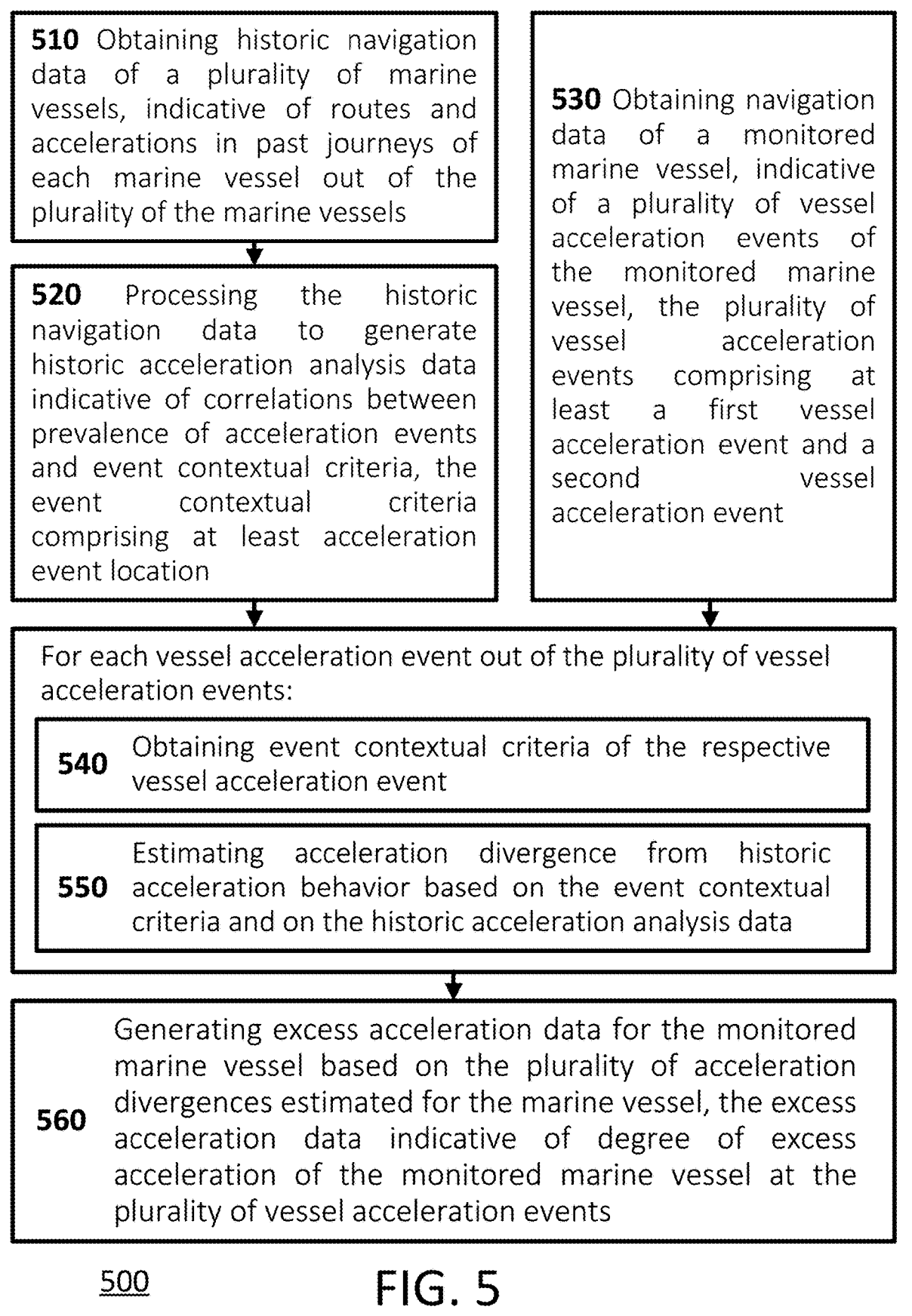

510 Obtaining historic navigation data of a plurality of marine vessels, indicative of routes and accelerations in past journeys of each marine vessel out of the plurality of the marine vessels

520 Processing the historic navigation data to generate historic acceleration analysis data indicative of correlations between prevalence of acceleration events and event contextual criteria, the event contextual criteria comprising at least acceleration event location

530 Obtaining navigation data of a monitored marine vessel, indicative of a plurality of vessel acceleration events of the monitored marine vessel, the plurality of vessel acceleration events comprising at least a first vessel acceleration event and a second vessel acceleration event For each vessel acceleration event out of the plurality of vessel acceleration events:

540 Obtaining event contextual criteria of the respective vessel acceleration event

550 Estimating acceleration divergence from historic acceleration behavior based on the event contextual criteria and on the historic acceleration analysis data

560 Generating excess acceleration data for the monitored marine vessel based on the plurality of acceleration divergences estimated for the marine vessel, the excess acceleration data indicative of degree of excess acceleration of the monitored marine vessel at the plurality of vessel acceleration events

500

FIG. 5

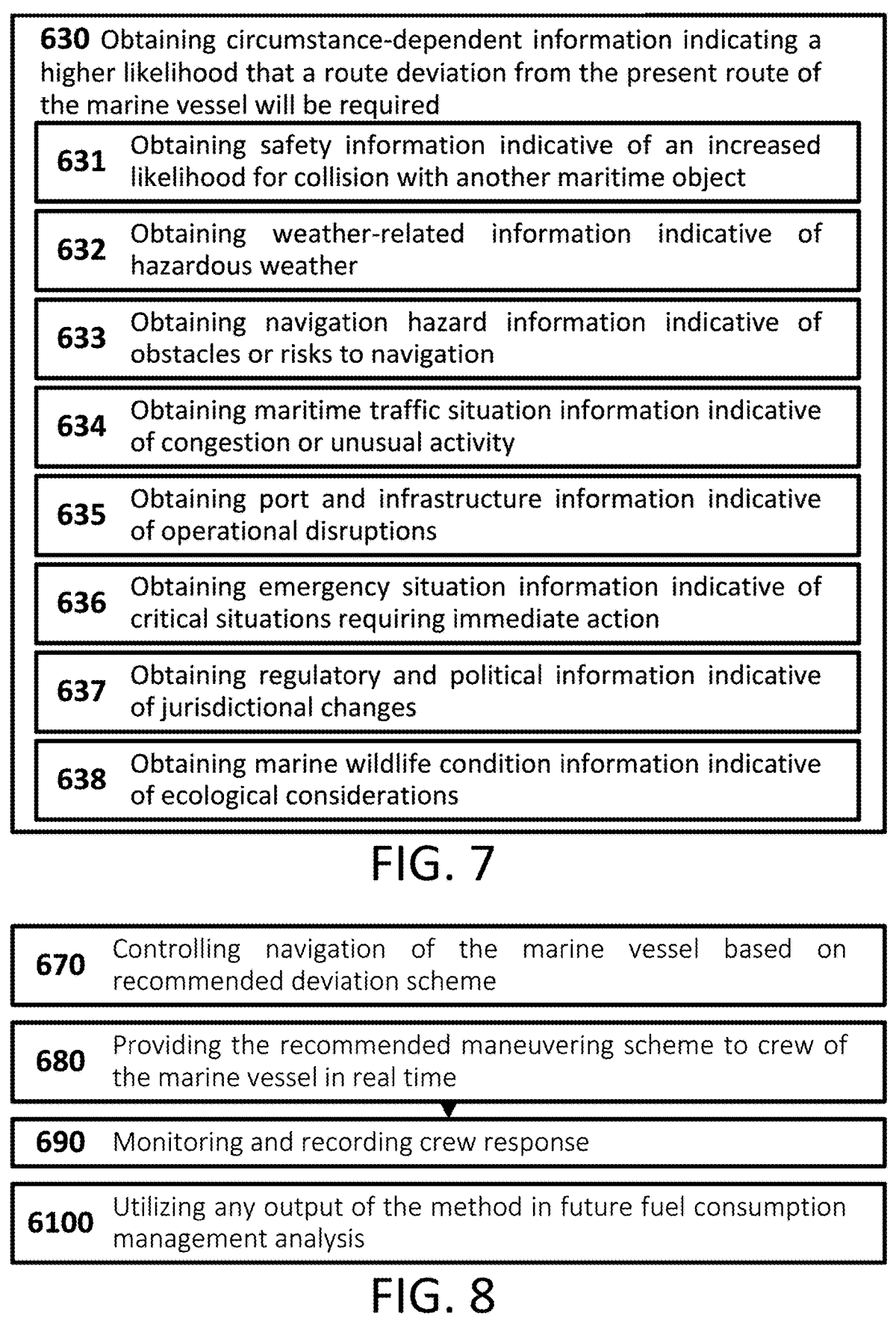

630 Obtaining circumstance-dependent information indicating a higher likelihood that a route deviation from the present route of the marine vessel will be required

631 Obtaining safety information indicative of an increased likelihood for collision with another maritime object

632 Obtaining weather-related information indicative of hazardous weather

633 Obtaining navigation hazard information indicative of obstacles or risks to navigation

634 Obtaining maritime traffic situation information indicative of congestion or unusual activity

635 Obtaining port and infrastructure information indicative of operational disruptions

636 Obtaining emergency situation information indicative of critical situations requiring immediate action

637 Obtaining regulatory and political information indicative of jurisdictional changes

638 Obtaining marine wildlife condition information indicative of ecological considerations

FIG. 7

670 Controlling navigation of the marine vessel based on recommended deviation scheme

680 Providing the recommended maneuvering scheme to crew of the marine vessel in real time

690 Monitoring and recording crew response

6100 Utilizing any output of the method in future fuel consumption management analysis

FIG. 8

FUEL CONSUMPTION OPTIMIZATION

FIELD

The invention is related to systems, methods, and computer program products for fuel consumption optimization.

BACKGROUND

The operation of ships and other marine vessels requires significant fuel consumption, which has both economic and environmental implications. Efficient fuel management is therefore a critical aspect of maritime operations. Computational technology may be used to assist in optimizing fuel usage. This presents an opportunity to improve operational sustainability and cost-effectiveness in fuel consumption by marine vessels. There is therefore a need in the art for novel systems, methods, and computer program products for management, optimization, and/or analysis of fuel consumption by marine vessels.

GENERAL DESCRIPTION OF THE INVENTION

Efficient fuel consumption is critical for the maritime industry, encompassing by way of example international commerce, cruise voyages, and domestic transportation. Ships play a pivotal role in the global economy, carrying approximately 90% of the world's trade by volume. Fuel expenses constitute a significant portion of operational costs, and the environmental impact of fuel consumption is increasingly scrutinized due to stringent international regulations, such as those imposed by the International Maritime Organization (IMO).

One of the key factors adversely affecting fuel efficiency in ships are accelerations, and especially unplanned accelerations, with the term "acceleration" used herein to refer both to increases and decreases in velocity. These fluctuations often arise due to varying operational conditions, such as last-minute route adjustments and abrupt responses to traffic, safety, or weather conditions. Such unplanned accelerations disrupt operational consistency and result in inefficiencies in utilization of the propulsion system, leading to disproportionate increases in fuel consumption. For instance, frequent reductions in speed require re-acceleration to cruising velocity, which consumes substantially more fuel than maintaining a steady pace.

For example, in the context of international commerce, where massive container ships transport goods across oceans, even minor inefficiencies can result in considerable financial and environmental costs. Similarly, cruise voyages, which prioritize passenger comfort and adherence to rigid schedules, are highly susceptible to fuel inefficiencies caused by unanticipated changes in speed. in another example, domestic commerce, including ferries and smaller freight vessels, often operates in constrained waterways with dense traffic, further amplifying the prevalence of unplanned accelerations.

Determining fuel efficiency in a vessel or a fleet of vessels is complex due to the interaction of multiple dynamic factors. Vessel characteristics, including size, design, propulsion system, and age, play a major role, with older ships often consuming more fuel. Operating conditions such as sea state, wind, currents, and temperature further complicate efficiency assessments, as adverse weather significantly increases fuel use.

Operational decisions like speed, route planning, and cargo distribution directly affect consumption. Frequent speed changes in busy waterways exacerbate fuel inefficiencies, particularly due to unplanned accelerations. Limitations of fuel monitoring add another layer of difficulty. Accurate analysis requires consistent data on fuel flow, engine performance, and environmental conditions, but such data is not always readily available. Finally, compliance with environmental regulations and the need to maintain tight schedules often force trade-offs, further complicating efficiency evaluations. Advanced systems integrating real-time monitoring, predictive analytics, and control algorithms are essential to address these challenges and optimize maritime fuel usage.

According to an aspect of the invention, there is disclosed a system for improving fuel consumption of a marine vessel, the system comprising: (i) at least one processor; and (ii) at least one memory module including computer program code; the at least one memory and the computer program code are configured, with the at least one processor, to cause the system to at least: (a) obtain safety information indicative of an increased likelihood for collision of the marine vessel with another maritime object; (b) process current navigational data of the marine vessel—data that is indicative of expected progression of the marine vessel—in view of the safety information, to generate a set of possible deviation maneuvering schemes for the marine vessel with respect to the other maritime object which qualify a collision prevention safety criterion; (c) perform fuel consumption analysis for the set of possible deviation maneuvering schemes to assess fuel consumption in different possible deviation maneuvering schemes; and (d) compute a recommended deviation scheme for the marine vessel based on results of the fuel consumption analysis, to reduce fuel consumption of the marine vessel in maneuvering with respect to the other maritime object.

According to a further aspect of the invention, the at least one processor and the at least one memory module are located onboard the marine vessel, with the system further including sensors onboard the marine vessel for collecting providing to the processor sensor data for generation by the processor of the recommended deviation scheme.

According to a further aspect of the invention, the at least one memory and the computer program code may be configured, with the at least one processor, to cause the system to compute the recommended deviation scheme at least partly based on the recommended deviation scheme having a smaller fuel consumption estimate in the fuel consumption analysis than any analyzed possible deviation maneuvering scheme with shorter estimated overall maneuvering duration.

According to a further aspect of the invention, the at least one memory and the computer program code may be configured, with the at least one processor, to cause the system to compute the recommended deviation scheme at least partly based on the recommended deviation scheme having a smaller fuel consumption estimate in the fuel consumption analysis than an alternative analyzed possible deviation maneuvering scheme with an estimated overall maneuvering duration shorter by at least 10% than an estimated overall maneuvering duration of the recommended deviation scheme.

According to a further aspect of the invention, the at least one memory and the computer program code may be configured, with the at least one processor, to cause the system to compute the recommended deviation scheme to minimize deceleration of the marine vessel during the deviation maneuver.

According to a further aspect of the invention, the at least one memory and the computer program code may be configured, with the at least one processor, to cause the system to compute the recommended deviation scheme in which an expected deceleration of the marine vessel is smaller than expected decelerations of any other at least one analyzed possible deviation maneuvering scheme having an estimated overall maneuvering duration shorter by up to 10% than an estimated overall maneuvering duration of the recommended deviation scheme.

According to a further aspect of the invention, the at least one memory and the computer program code may be configured, with the at least one processor, to cause the system to generate the recommended deviation scheme for the marine vessel at least four hours before a time of nearest distance between the marine vessel and the other maritime object.

According to a further aspect of the invention, the at least one memory and the computer program code may be configured, with the at least one processor, to cause the system to trigger a deviation of the marine vessel based on the recommended deviation scheme, the deviation including modifying of direction of the marine vessel by at least 2° over less than 30 minutes.

According to an aspect of the invention there is disclosed a computer-implemented method for improving fuel consumption of a marine vessel, the method including executing on a processor the steps of: (a) obtaining safety information indicative of an increased likelihood for collision of the marine vessel with another maritime object; (b) processing current navigational data of the marine vessel—data that is indicative of expected progression of the marine vessel—in view of the safety information, to generate a set of possible deviation maneuvering schemes for the marine vessel with respect to the other maritime object which qualify a collision prevention safety criterion; (c) performing fuel consumption analysis for the set of possible deviation maneuvering schemes to assess fuel consumption in different possible deviation maneuvering schemes; and (d) computing a recommended deviation scheme for the marine vessel based on results of the fuel consumption analysis, to reduce fuel consumption of the marine vessel in maneuvering with respect to the other maritime object.

According to a further aspect of the invention, the processing, generating, performing, and computing are executed onboard the marine vessel further in response to sensor data obtained from sensors installed on the marine vessel.

According to a further aspect of the invention, the computing of the recommended deviation scheme includes computing the recommended deviation scheme at least partly based on the recommended deviation scheme having a smaller fuel consumption estimate in the fuel consumption analysis than any analyzed possible deviation maneuvering scheme with shorter estimated overall maneuvering duration.

According to a further aspect of the invention, the computing of the recommended deviation scheme includes computing the recommended deviation scheme at least partly based on the recommended deviation scheme having a smaller fuel consumption estimate in the fuel consumption analysis than an alternative analyzed possible deviation maneuvering scheme with an estimated overall maneuvering duration shorter by at least 10% than an estimated overall maneuvering duration of the recommended deviation scheme.

According to a further aspect of the invention, the computing of the recommended deviation scheme includes computing the recommended deviation scheme to minimize deceleration of the marine vessel during the deviation maneuver.

According to a further aspect of the invention, the computing of the recommended deviation scheme includes computing the recommended deviation scheme in which an expected deceleration of the marine vessel is smaller than expected decelerations of any other at least one analyzed possible deviation maneuvering scheme having an estimated overall maneuvering duration shorter by up to 10% than an estimated overall maneuvering duration of the recommended deviation scheme.

According to a further aspect of the invention, the method further includes reiterating at least thrice the steps of: processing current navigational data to generate a new set of possible deviation maneuvering schemes for the marine vessel; performing fuel consumption analysis for the new set of possible deviation maneuvering schemes and computing a new recommended deviation scheme for the marine vessel different than the recommended deviation scheme of the previous iteration to reduce fuel consumption of the marine vessel in maneuvering with respect to the other maritime object.

According to a further aspect of the invention, the generating of the recommended deviation scheme for the marine vessel is executed at least four hours before a time of nearest distance between the marine vessel and the other maritime object.

According to a further aspect of the invention, the method further includes triggering a deviation of the marine vessel based on the recommended deviation scheme, the deviation including modifying of direction of the marine vessel by at least 2° over less than 30 minutes.

According to an aspect of the invention, there is disclosed a non-transitory computer-readable medium for fuel consumption optimization including instructions stored thereon, that when executed on a processor, perform the steps of: (a) obtaining safety information indicative of an increased likelihood for collision of the marine vessel with another maritime object; (b) processing current navigational data of the marine vessel—data that is indicative of expected progression of the marine vessel—in view of the safety information, to generate a set of possible deviation maneuvering schemes for the marine vessel with respect to the other maritime object which qualify a collision prevention safety criterion; (c) performing fuel consumption analysis for the set of possible deviation maneuvering schemes to assess fuel consumption in different possible deviation maneuvering schemes; and (d) computing a recommended deviation scheme for the marine vessel based on results of the fuel consumption analysis, to reduce fuel consumption of the marine vessel in maneuvering with respect to the other maritime object.

According to an aspect of the invention, pertaining to the second non-transitory computer-readable medium, optionally the computing of the recommended deviation scheme may include computing the recommended deviation scheme at least partly based on the recommended deviation scheme having a smaller fuel consumption estimate in the fuel consumption analysis than any analyzed possible deviation maneuvering scheme with shorter estimated overall maneuvering duration.

According to an aspect of the invention, pertaining to the second non-transitory computer-readable medium, optionally the computing of the recommended deviation scheme may include computing the recommended deviation scheme at least partly based on the recommended deviation scheme having a smaller fuel consumption estimate in the fuel consumption analysis than an alternative analyzed possible deviation maneuvering scheme with an estimated overall maneuvering duration shorter by at least 10% than an estimated overall maneuvering duration of the recommended deviation scheme.

According to an aspect of the invention, pertaining to the second non-transitory computer-readable medium, optionally the computing of the recommended deviation scheme may include computing the recommended deviation scheme to minimize deceleration of the marine vessel during the deviation maneuver.

According to an aspect of the invention, pertaining to the second non-transitory computer-readable medium, optionally the computing of the recommended deviation scheme may include computing the recommended deviation scheme in which an expected deceleration of the marine vessel is smaller than expected decelerations of any other at least one analyzed possible deviation maneuvering scheme having an estimated overall maneuvering duration shorter by up to 10% than an estimated overall maneuvering duration of the recommended deviation scheme.

According to an aspect of the invention, the second non-transitory computer-readable medium may further include instructions stored thereon, that when executed on the processor, performs reiterating at least thrice the steps of: processing current navigational data to generate a new set of possible deviation maneuvering schemes for the marine vessel; performing fuel consumption analysis for the new set of possible deviation maneuvering schemes and computing a new recommended deviation scheme for the marine vessel different than the recommended deviation scheme of the previous iteration to reduce fuel consumption of the marine vessel in maneuvering with respect to the other maritime object.

According to an aspect of the invention, the second non-transitory computer-readable medium may further include instructions stored thereon, that when executed on the processor, perform the steps of: triggering a deviation of the marine vessel based on the recommended deviation scheme, the deviation including modifying of direction of the marine vessel by at least 2° over less than 30 minutes. According to a further aspect of the invention,

BRIEF DESCRIPTION OF THE DRAWINGS

In order to understand the invention and to see how it may be carried out in practice, embodiments will now be described, by way of non-limiting examples only, with reference to the accompanying drawings, in which:

FIG. 5 is a flow chart illustrating an example of a computer-implemented method for fuel consumption management of marine vessels;

FIGS. 7 and 8 illustrates various optional steps of the computer-implemented method for improving fuel consumption of the marine vessel;

Figure 1:
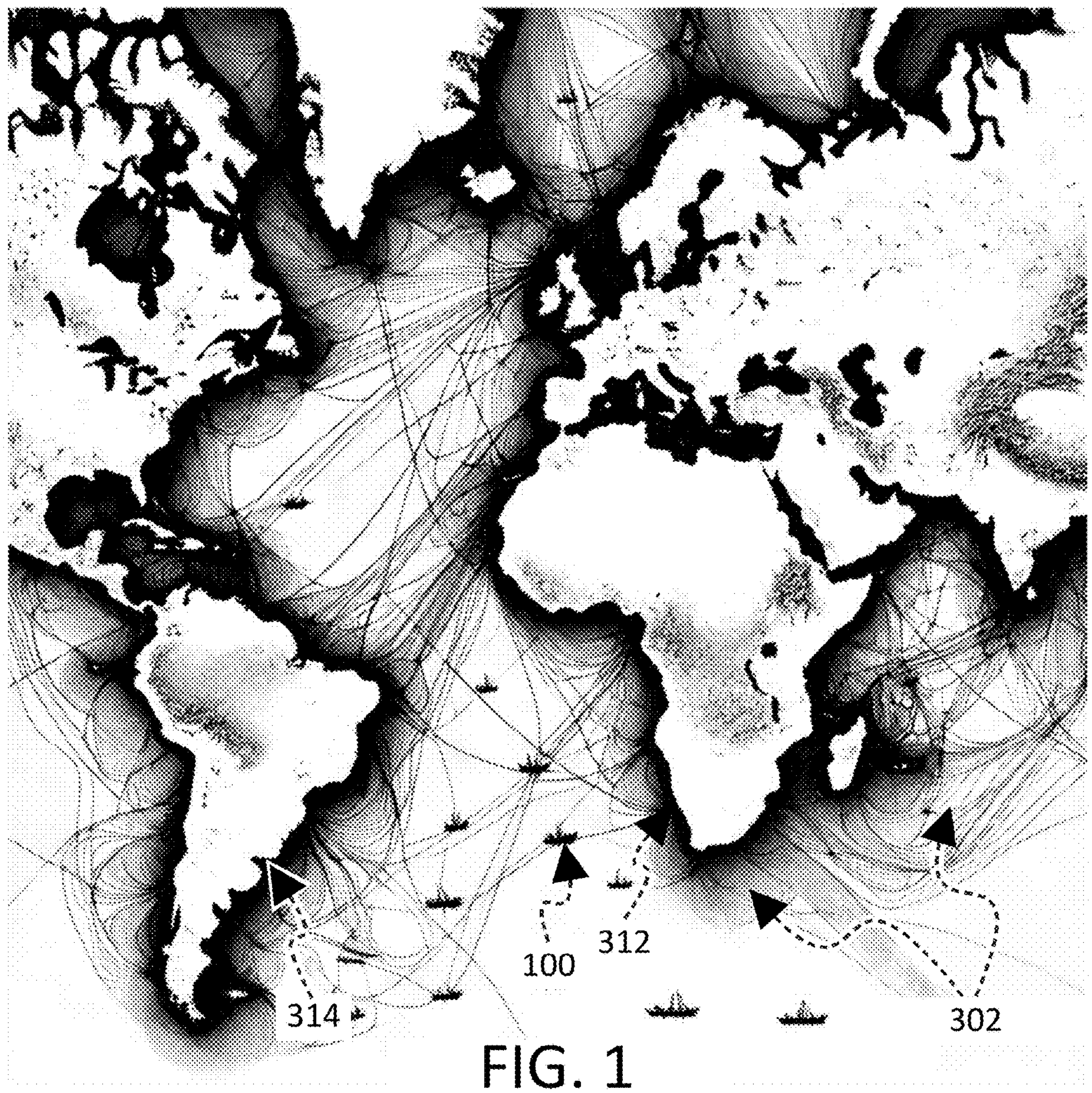
FIG. 1 illustrates a marine vessel sailing between two ports along an established sailing.

It will be appreciated that for simplicity and clarity of illustration and description, certain elements in the figures may not have been drawn to scale. This could include the exaggeration of certain element dimensions relative to others. Additionally, corresponding or analogous elements may be identified using repeated reference numerals in the figures.

DETAILED DESCRIPTION OF EMBODIMENTS

In the following detailed description, numerous specific details are provided to ensure a comprehensive understanding of the invention. While these details aid in understanding, those skilled in the art will recognize that the invention can be implemented without these specific details. In addition, well-known methods, procedures, and components are not described in detail to avoid obscuring the invention. References to a method, system, or non-transitory computer readable medium should be interpreted inclusively, as including related aspects of the invention.

The functionality of the elements described herein may be implemented using circuitry or processing circuitry such as general-purpose processors, special purpose processors, integrated circuits, Application Specific Integrated Circuits (ASICs), and other conventional circuitries. Such circuitries and/or combinations thereof may be configured and/or programmed to perform the disclosed functionality. This also includes emerging technologies such as quantum processors and AI-driven systems. Processors, containing transistors and other components, are considered part of this circuitry. In this disclosure, the terms ‘circuitry’, ‘units’, or ‘means’ refer to hardware configured to perform the disclosed functions. Such processor may be implemented as purely hardware circuitry. In other possible implementations, processors, controllers, computers, units, or other means may be implemented using any combination of hardware with software and/or firmware.

The terms “computer”, “processor”, and “controller” should be expansively construed to cover any kind of electronic device with data processing capabilities, including, by way of non-limiting example, a personal computer, a server, a computing system, a communication device, a processor (e.g. digital signal processor, DSP), a microcontroller, a field programmable gate array (FPGA), an application specific integrated circuit (ASIC), a smartphone, an electronic control unit (ECU) of a vehicle, cloud computing servers, an and so on. Unless stated otherwise, the terms “computer”, “processor”, and “controller” may also include a combination of several modules (e.g., several central processing units, CPUs), which operate together toward a goal. Unless specifically stated otherwise, as apparent from the following discussions, it is appreciated that throughout the specification discussions utilizing terms such as "processing", "calculating", "computing", "determining", "generating", "setting", "configuring", "selecting", "defining", or the like, include actions and/or processes of a computer that manipulate and/or transform data into other data. That data is represented as physical quantities, e.g., such as electronic or electromagnetic quantities, and/or said data representing physical objects.

It is appreciated that certain features of the presently disclosed subject matter, which are, for the sake of clarity of description, described in the context of separate embodiments, may also be combined in a single embodiment. Conversely, various features of the presently disclosed subject matter, which are, for brevity, described in the context of a single embodiment, may also be provided separately or in any suitable sub-combination. In embodiments of the presently disclosed subject matter one or more steps illustrated in the figures may be executed in a different order and/or one or more groups of steps may be executed simultaneously. The figures illustrate a general schematic of the system architecture in accordance with an embodiment of the presently disclosed subject matter. Each module in the figures can be made up of any combination of software, hardware and/or firmware that performs the functions as defined and explained herein. The modules in the figures may be centralized in one location or dispersed over more than one location.

Any reference in the specification to a method should be applied mutatis mutandis to a system capable of executing the method. Any reference in the specification to a method which can be executed by a computer should be applied mutatis mutandis to a non-transitory computer readable medium that stores instructions that once executed by a computer result in the execution of the method. All the details, variations, optional features, optional steps which are discussed with respect to a system are also applicable, mutatis mutandis, to such a corresponding method (and non-transitory computer readable medium, where applicable), and vice versa.

The term "any combination of any one or more of the following" used in the disclosure, as well as similarly worded phrases, is used as a shorthand to refer to each respective combination of the following items, whether these items are numbered, listed, or otherwise disclosed within a closed and identifiable list. Such combinations may include any one item alone, any two items, any three items, and so on, or all items together. This phrase is not limited to the explicit examples provided for specific combinations, if provided, but extends to any permutations, subsets, and configurations thereof that would be apparent to a person having ordinary skill in the art. The scope of such combinations includes items explicitly enumerated, as well as equivalents and variations that achieve substantially similar purposes or functions.

FIG. 1 illustrates marine vessel 100 sailing between two ports (port 312 and port 314) along an established sailing route 302. While sailing along an established sailing route, marine vessels like marine vessel 100 nevertheless sail in unique routes, depending on factors such as weather conditions, sea currents, cargo type, vessel size, traffic density, safety incidents, and specific operational directives. The unique route of each marine vessel includes the path the marine vessel undertook, as well as the timings and the velocities of the respective marine vessel along the path. Considering the locations, times, velocities, and accelerations of a marine vessel along its route, some of these factors can be foreseen in advance, others can be understood in hindsight (e.g., based on sensor data, weather information, traffic information), while yet others pertain to real-time decision-making and adjustments during the voyage.

For example, adverse weather conditions, such as storms or high winds, may compel a vessel to deviate significantly from its planned route, prioritizing safety and stability over strict adherence to the initial schedule. Similarly, favorable sea currents can influence the timing and efficiency of a vessel's movement, prompting adjustments to optimize fuel consumption and reduce transit time. Traffic density near major shipping lanes or ports often necessitates real-time course corrections to avoid collisions and ensure compliance with maritime regulations. Additionally, unforeseen safety incidents, such as mechanical issues or emergencies on board, may result in immediate and unplanned changes to a vessel's trajectory and operational plans. Each of these adjustments, whether planned or reactive, highlights the dynamic and complex nature of marine navigation.

The systems, methods, and computer program products discuss below are all related to different aspects to fuel consumption analysis, management, and decision making.

Figure 2A:
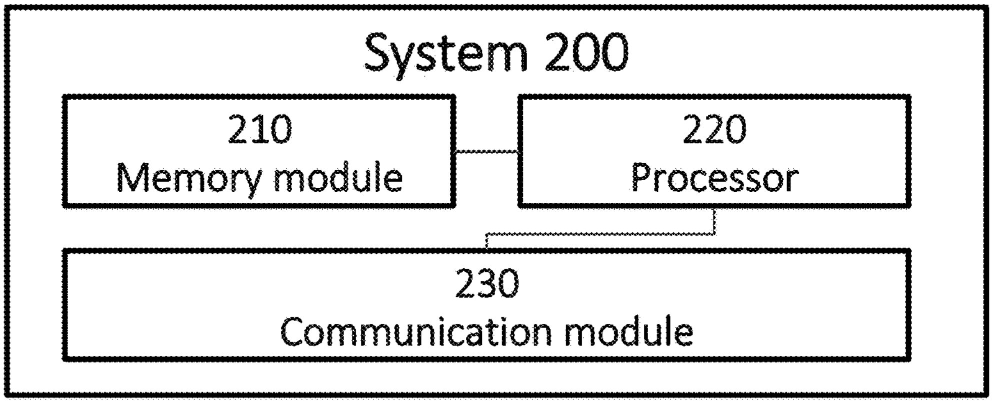
FIGS. 2A and 2B are functional block diagrams illustrating examples of a computerized system.
Figure 2B:
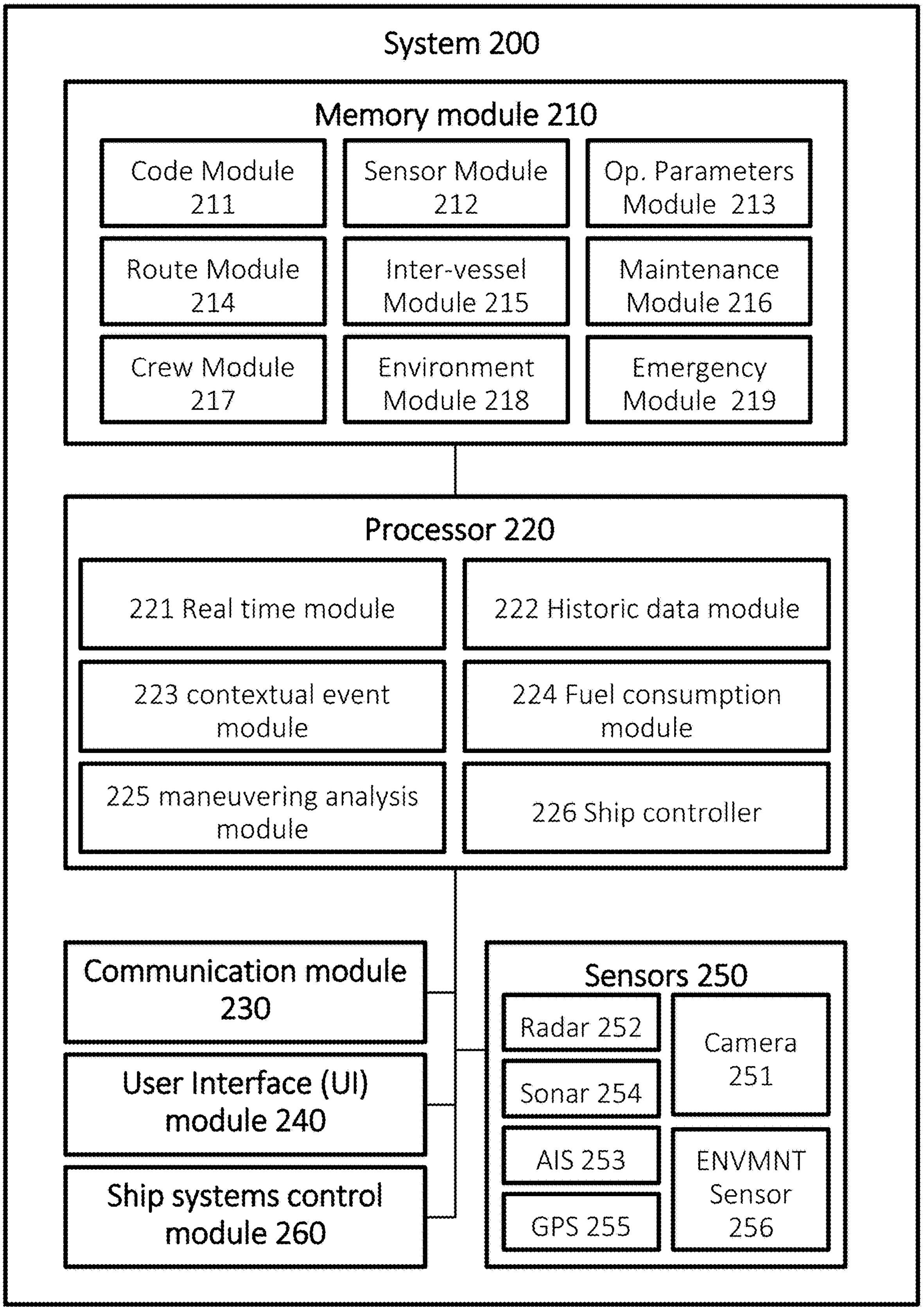

FIGS. 2A and 2B are functional block diagrams illustrating examples of system 200, in accordance with the presently disclosed subject matter. System 200 is a fuel analysis system, which can process, analyze, and possibly control fuel consumption related data, decisions, and actions. While not necessarily so, system 200 may be operable to execute method 500 and/or method 600, or any combination of any one or more steps from one or both of methods 500 and 600. Any detail discussed with respect to method 500 and/or to method 600 might be performed by system 200 (e.g., by the least one tangible memory module 210 or by processor 210), mutatis mutandis. Especially, processor 220 may optionally be configured and operable to execute any processing step, processing substep, combination of several processing steps (or processing substeps) of method 500 and/or of method 600. It is noted that any step, substep, combination of several steps (or substeps), variation or discussion provided below with respect to method 500 and/or to method 600 may be implemented as part of system 200, mutatis mutandis, even if not explicitly stated, and that many such details are not repeated with respect to system 200 in the interest of concision.

System 200 includes at least one tangible memory module 210 that is operable to store any combination of one or more of the following:

a. Code reservoir 211 for storing executable instructions required for the operation of processes and execution of code by processor 220, such as diagnostic routines for fuel consumption analysis, routines for processing sensors data, routines for communication with other computer systems, routines for execution of any combination of one or more steps of methods 500 and/or 600, and so on.
b. Sensor data module 212 for storing data received from one or more sensors 250 of the marine vessel (or otherwise available to the marine vessel, e.g., from associated drones, systems carried by the crews, sensors of external vessels, etc.), such as any one or more of the following: camera data for visual inspections and monitoring, radar data for detecting objects and navigation support, AIS (Automatic Identification System) data for compliance and communication with marine traffic systems, sonar readings for underwater mapping, GPS coordinates and satellite data for geolocation, environmental data such as water temperature, salinity, and wave heights.

c. Operational parameters module 213 for storing operational parameters of the marine vessel, such as any one or more of the following: engine performance metrics such as RPM, fuel related data (e.g., fuel levels, engine fuel requirements), electrical system status including power distribution and battery levels, cargo weight and distribution, ballast levels and placement, hydrodynamic profiles of loaded cargo, and real-time updates on load shifts during navigation. Such parameters may affect, for example, fuel consumption and maneuvering capabilities.

d. Route information module 214 for storing information about the route, such as any one or more of the following: historical route data (of this or past voyages), real-time navigation data, planned route including contingencies and alternate paths, data regarding different parts of the route (which the marine vessel already pass, is planned to pass through, or might pass through). Route information module 214 may include parameters indicative of locations, times, velocities, and acceleration for any part of the route: sailed, planned, or optional.

e. Inter-vessel data module 215 for storing data about other marine vessels or objects in the marine environment, such as: AIS (Automatic Identification System) data about nearby vessels such as position, speed, and identification, information about fixed or floating maritime objects, including buoys, platforms, or underwater hazards, communication logs between vessels for situational awareness and coordination. Such data may be based for example on sensor data, mapping information, and so on.

f. Maintenance module 216 for storing records and schedules related to vessel maintenance and diagnostics, such as: logs of completed maintenance activities and future maintenance schedules, diagnostic data captured during operation, such as system anomalies and error codes, predictive analytics data for proactive maintenance planning.

g. Crew information module 217 for storing data relevant to crew and possibly passengers aboard the vessel, such as: identity, experience, pass voyages data, crew schedules, certifications, and personal information, muster station assignments.

h. Environmental impact module 218 for storing data related to the vessel's environmental footprint, such as: records of emissions, waste generation, and disposal methods, compliance data with international maritime environmental standards, optimizations for fuel efficiency and pollutant reduction.

i. Emergency module 219 for storing critical data for emergencies, such as: vessel-specific emergency procedures and protocols, real-time access to distress signals and rescue operation plans, maps and resources for nearby rescue stations or safe harbors.

Regarding all types of data and all kinds of example memory modules described above, or any other data which may be stored in memory module 210, it should be noted that such data may be provided to system 200 by external sources and/or generated internally during data processing operations. For instance, data may be generated by system 200 as a result of executing any one or more steps of method 500 and/or method 600, data may be generated by system 200 by processing data stored in memory module 210, etc.

Memory module 210 may include one or more tangible memory storage units of any suitable type of tangible memory storage units, including for example non-volatile memory, volatile memory, solid-state drives, hard disk drives, or other hybrid storage devices. Memory Module 210 may further include units distributed across various locations, such as any combination of: on the marine vessel itself, on other marine vessels, on land-based systems, or within remote server environments. Connectivity to such distributed memory units may be achieved via a wide array of communication technologies, including, but not limited to, internet connections, wireless communication protocols, cloud-based communication frameworks, and satellite communication systems. Such a distributed and modular memory configuration, if implemented, may be used for providing system 200 with flexibly and ability to efficiently manage, process, and access data from diverse sources and locations, enhancing its operational capabilities in dynamic marine environments. Optionally, all of the one or more memory units collectively referred to as memory module 210 are located on marine vessel 100 itself. Optionally, all of the one or more memory units collectively referred to as memory module 210 are located in a remote location (e.g., onshore control center, fleet control center).

System 200 further includes at least one processor 220, which may encompass a variety of processor types and configurations to support the computational and operational requirements of the system. Such processors may include, for example, any combination of any one or more units of any one or more of the following types: general-purpose central processing units (CPUs), graphics processing units (GPUs) for parallel data processing, application-specific integrated circuits (ASICs), or field-programmable gate arrays (FPGAs) for customized computing tasks. Processor 220 may be located on any one or more of the following: on the marine vessel, integrated with other components of system 200, on a land-based system (e.g., a control center, onshore cloud processing server, etc.), or distributed across multiple locations to enhance redundancy and processing efficiency. In certain implementations, processor 220 may include units located remotely, such as on other vessels, land-based infrastructure, or within cloud computing environments. Connectivity between such remote processors may be achieved via robust communication technologies, including wired and wireless networks, internet protocols, satellite links, and other secure communication channels. This configuration ensures that System 200 can efficiently process data in real time, adapt to changing operational demands, and maintain seamless functionality across diverse marine and terrestrial environments. Optionally, all of the one or more processing units collectively referred to as processor 220 are located on marine vessel 100 itself. Optionally, all of the one or more processing units collectively referred to as processor 220 are located in a remote location (e.g., onshore control center, fleet control center).

Optionally, system 200 may further include communication module 230 that is operable to enable data exchange between system 200 and any relevant external or internal system. Communication module 230 may encompass various types of communication technologies, including, but not limited to, wired communication protocols, wireless communication protocols, satellite communication systems, internet-based communication, and cloud-based connectivity. For example, communication module 230 may facilitate communication with any one or more of the following: marine vessel(s) (e.g., marine vessel 100 and/or other marine vessels), onshore control center(s), land-based infrastructure(s), onboard sensor(s), marine vessel computer system(s), and other relevant systems. Additionally, communication module 230 may optionally support the transmission and reception of data critical for navigation, operational management, environmental monitoring, and emergency response, generated by system 200.

Optionally, system 200 may include User Interface (UI) module 240, designed to enable efficient interaction between the system and human operators, such as the vessel crew, control center crew, supervisory personnel, and so on. UI module may optionally support input and/or output functionalities, e.g., for any one of the following purposes: allowing users to provide operational commands, adjust system parameters, and access processed data or system diagnostics, provides users with data resulting from processing of information by system 200, providing users data required for operation of the marine vessel, and so on. UI Module 240 may include various forms of human-machine interfaces, such as monitors, touchscreens, graphical displays, keyboards, speakers, levers, buttons, dials, and voice command systems.

Optionally, system 200 may include one or more sensors 250, such as any one or more of any one or more of the following types:

a. Camera 251, operable to capture still and/or video visual data, e.g., of any one or more of the following: the surroundings of the marine vessel, areas within the marine vessel, systems of the marine vessel, etc.
b. Radar 252, operable to detect objects and provide navigation support, e.g., by detecting nearby vessels, obstacles, or other navigational hazards.
c. AIS 253, operable to provide Automatic Identification System data for compliance and communication with marine traffic systems, e.g., information about nearby vessels, including their position, speed, and identification.
d. Sonar 254, operable to provide underwater mapping data, e.g., to detect seabed topography, underwater obstacles, or marine life.
e. GPS and Satellite System 255, operable to provide geolocation information, e.g., precise positioning of the marine vessel and its routes through GPS coordinates and satellite data.
f. Environmental Sensor 256, operable to monitor environmental metrics, e.g., water temperature, salinity, wave heights, and other relevant environmental conditions.

It is noted that system 200 may optionally include any one or more of the above types of sensors (or of any other useful type of sensor, e.g., sensor whose outputs may benefit the functionalities and computations of system 200). Additionally or alternatively, system 200 may optionally receive data from any one or more of the above types of sensors (or of any other useful type of sensor) from external sources, such as the sensors themselves, intermediate systems, marine vessels on which such sensors are installed, and so on. The sensors data may be provided to processor 220 and/or to memory module 210 in its raw format, or in any useful processed form (e.g., compressed, pre-processed, analyzed, and so on).

Optionally, system 200 may include ship systems control module 260 that is operable to manage and regulate operations of one or more key ship systems, e.g., for efficient and safe operation of marine vessel 100. For example, ship systems control module 260 may optionally control (automatically, under human supervision, and/or in tandem with other systems) any one or more of the following ship systems: propulsion systems (e.g., main and auxiliary engines), steering systems (e.g., rudders and stabilizers), navigation aids, and power distribution. The module may also oversee equipment such as ballast water management systems, cooling systems, and cargo handling machinery. By dynamically adjusting these systems—e.g., based on any data, such as real-time data, generated by processor 220 as discussed in greater detail below, ship systems control module 260 may be used to optimize fuel efficiency, maintains vessel stability, reduces environmental impact, and ensures compliance with safety protocols. Optionally, ship systems control module 260 may support manual and/or automated operations, enhancing overall vessel performance and operational reliability.

Figure 3:
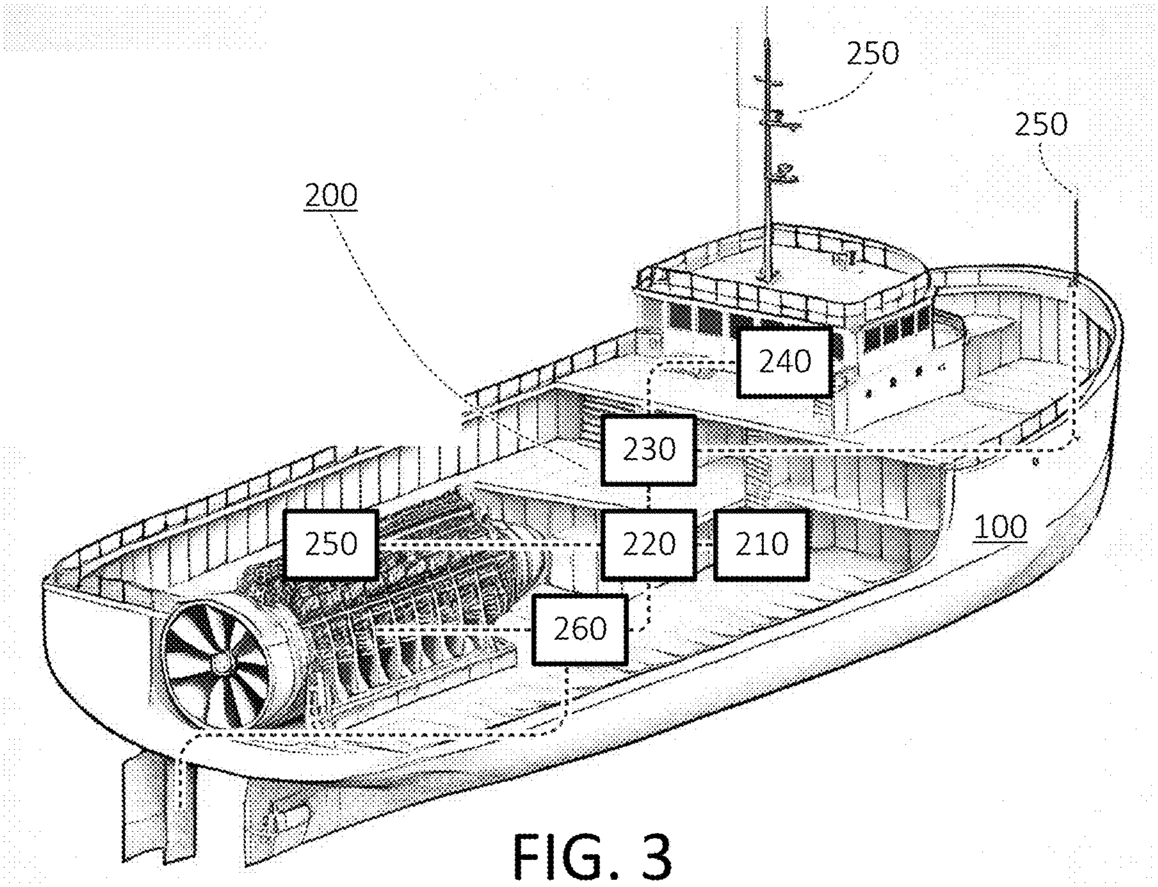
FIG. 3 illustrates a computerized system installed on a marine vessel whose fuel consumption the computerized system monitors, analyzes, and/or manages.

FIG. 3 illustrates system 200 installed on marine vessel 100 whose fuel consumption system 200 monitors, analyzes, and/or manages, in accordance with examples of the presently disclosed subject matter. As aforementioned, some components of system 200 may also be located away from the marine vessel, but this is not shown in the example of FIG. 3.

Figure 4:
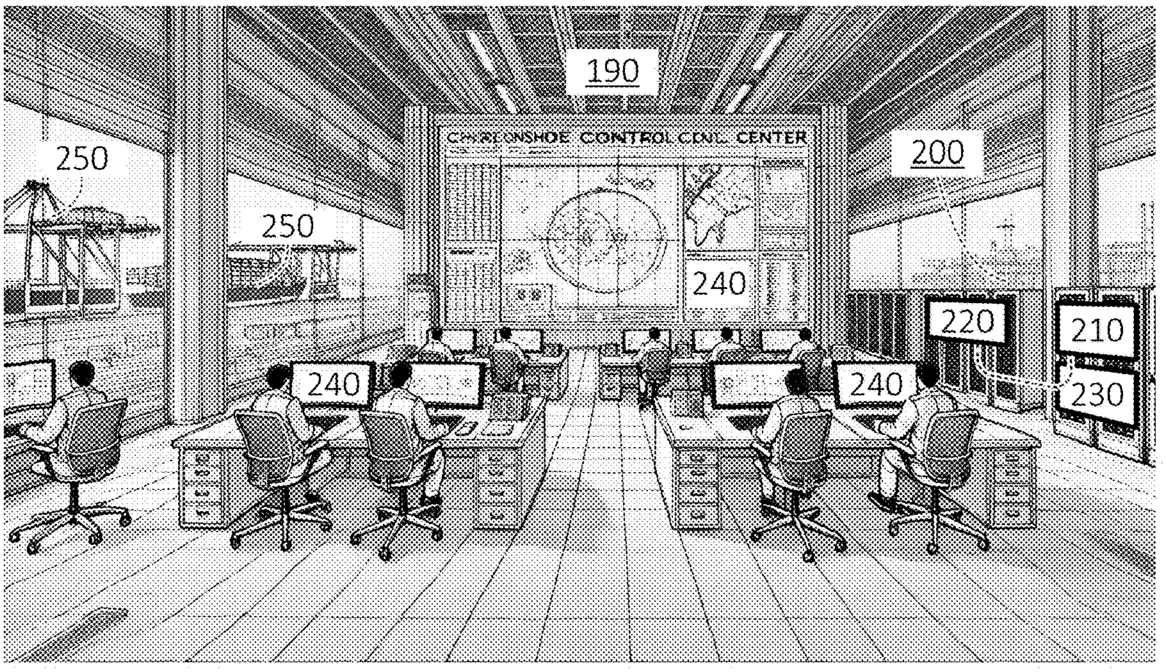
FIG. 4 illustrates a computerized system installed on an onshore marine control center, the computerized system being able centrally monitor, analyze, and/or manage fuel consumption of a plurality of marine vessels.

FIG. 4 illustrates system 200 installed on an onshore marine control center 190, who can centrally monitor, analyze, and/or manage fuel consumption of a plurality of marine vessels, near and far, in accordance with examples of the presently disclosed subject matter. As aforementioned, some components of system 200 may also be located away from control center 190, but this is not shown in the example of FIG. 4.

Additional discussion of system 200 is provided below, after the disclosure pertaining to methods 500 and 600.

FIG. 5 is a flow chart illustrating an example of method 500, in accordance with the presently disclosed subject matter. Method 500 is a computer-implemented method for fuel consumption management of marine vessels. Referring to the examples set forth with respect to the previous drawings, system 200 may be carried out by processor 220, e.g., with the help of any one or more of other components of system 200 like memory module 210, communication module 230, and so on. Method 500 includes executing on a processor at least steps 510, 520, 530, 540, 550, and 560, as well as optionally executing on the processor any one or more other optional step of method 500 as discussed below. The processor executing method 500 may include one or more processing units, communicating between them in wired and/or wireless manner, e.g., as discussed above with respect to processor 220. It is noted that method 500 may implement any feature, functionality, or variation discussed above with respect to system 200 and to any component thereof.

Step 510 includes obtaining historic data of a plurality of marine vessels, including at least historic navigation data of the plurality of marine vessels indicative of routes and accelerations in past voyages of each marine vessel out of the plurality of the marine vessels. The plurality of the marine vessels may include the one or more marine vessels for which excess acceleration data and/or excess fuel consumption data is created in later steps of the method, but this is not necessarily so. The historic navigation data may pertain to whole voyages of the plurality of the marine vessels, but in at least some of the cases it may also pertain to only parts of these voyages. For example, the historic data may focus to a larger extent on parts of the historic voyages that included more accelerations (the terms pertaining, as indicated above, to both increases and decreases in velocity). In another example the historic data may focus to a larger extent on parts of the historic voyages that took place in "hot spots", such as areas of the sea which are exposed to high traffic, bad weather conditions, frequent accelerations, and so on (e.g., next to shore, next to seaports, next to icebergs, and so on). Referring to the examples set forth with respect to the previous drawings, step 510 may optionally be executed by processor 220 and/or memory module 210.

The historic data may include any data that may affect fuel consumption of the respective marine vessel, as well as any other data, including any type of information discussed above with respect to memory module 210. For example, the historic data pertaining to a historic voyage of a marine vessel may include many data point pertaining to a condition of the respective marine vessel at different times, such as any one or more of the following:

a. Kinematic and navigational data, such as any one or more of the following: positioning data, velocity, acceleration, orientation, speed profile, heading and course, acceleration patterns, waypoint information (e.g., key navigational markers or turning points during voyages), pitch, yaw, and roll, and angular movements (e.g., angular velocities and acceleration)
b. Vessel surroundings information, pertaining to nearby vessels, maritime objects, and so on. For example, such data may include kinematic and navigational information of other marine vessels and other maritime objects, type of respective vessels and objects, identification of such vessels and objects, and relevant sensor data (e.g., radar data, camera records, computer logs with analytical or diagnostic records from onboard systems).
c. Environmental data such as: wind speed and direction; sea state such as wave height, frequency, and direction; ambient air and water temperatures; proximity to shorelines, ports, or land features affecting navigation.
d. Operational and logistical data, such as: cargo load and distribution, continuous operation time, and so on.
e. Personnel information, pertaining to crew members onboard the marine vessels, shifts, supervisory personnel offboard, and so on.
f. Engine performance data: engine load relative to maximum capacity; fuel flow rates per unit of time or distance; engine operation velocity (e.g., in Rounds Per Minutes—RPM), and operating hours providing insights into operational intensity and maintenance needs.
g. Historical weather and traffic conditions: historical weather patterns along routes; traffic density data in shipping lanes or congested areas.
h. Maintenance records: events such as hull cleaning or propeller servicing.
i. Fuel type and quality: specifications of fuel used, including variations in quality or type during different voyages;
j. Regulatory zones;
k. Information regarding recommended routes (e.g., based on past routes);
l. Seasonal information (e.g., fishing seasons, animal migration routes/zones).

Method 500 may optionally include collecting some or all of the historic data, e.g., by systems installed on these marine vessels (e.g., units of system 200) and/or by system installed in control centers etc., but this is not necessarily so.

Step 520 of method 500 includes processing the historic data (including at least the historic navigation data), to generate historic acceleration analysis data indicative of correlations between prevalence of acceleration events and event contextual criteria, the event contextual criteria including at least acceleration event location and/or any relevant acceleration event location criteria. The phrase "event contextual criteria" pertains to criteria relating to parameter values for the individual acceleration event, which can then possibly be clustered together as qualifying a certain event contextual criteria or not.

For example, analysis of acceleration events based on location may include any one or more of the following:

a. Dividing the sea into a grid of cells (e.g., rectangles, hexagons, or any other uniform on nonuniform tessellations) and assign the various acceleration events to the different cells based on their respective locations.
b. Using proximity analysis to calculate and log the distance of each acceleration event to an object or location belonging to a set of objects (e.g., to the nearest seaport, key landmark). The event contextual criteria may be the distance itself, or some classification of that distance (e.g., under 1 nautical mile (NM), between 1-10 NM, etc.).
c. Categorize acceleration event locations by area-use classification (e.g., inside a seaport, in the vicinity of a seaport, along a commercial trading route, remotely from a commercial trading route).
d. Apply clustering algorithms like DBSCAN or K-Means to identify whether certain acceleration events are parts of hotspots of acceleration events.

The phrase "acceleration event location criteria" and similar phrases pertain to criteria relating to location-related parameter values for the individual acceleration event, which can then possibly be clustered together as qualifying a certain event location-related criteria or not. Acceleration event location criteria may pertain to a specific area of the sea (e.g., a tile of a tessellation applied to a map of the sea) in which the acceleration event occurred, to a longitude in which the acceleration event occurred, to a latitude in which the acceleration event occurred, and so on.

Additionally, step 520 may include the generate historic acceleration analysis data that is further indicative of correlation between the prevalence of refined or granular types of acceleration events and event contextualization criteria, such as:

a. Correlations between prevalence of acceleration events of at least certain degrees of acceleration (e.g., based on degree of acceleration, duration of acceleration, etc.) and event contextual criteria;
b. Correlations between prevalence of acceleration events that were accompanied by specific types of other maneuvering (e.g., acceleration accompanied by deviation of more than 1°, more than 1 NM, from planned course) and event contextual criteria;
c. Correlations between prevalence of acceleration events that also required acceleration and/or maneuvering of other marine vessels and event contextual criteria;
d. Any combination of the above, or any other suitable classification of acceleration events.

Referring to the examples set forth with respect to the previous drawings, step 520 may optionally be executed by processor 220. It is noted that optionally, the historic data obtained at step 510 may already be processed to different degrees, from raw data to partly processed data, to actually obtaining a historic acceleration analysis data, in the latter case step may be omitted or null.

For example, event contextual criteria may include any of the aforementioned parameters, amalgamation of such parameters into groups, derived metrics that encapsulate broader patterns or characteristics (e.g., clusters of events sharing similar attributes), and so on. The processing of step 520 may include identifying potential correlations between these contextual criteria and events in which marine vessels accelerated, by employing a structured statistical approach. For example, step 520 may include any one or more of the following:

a. Identifying areas or locations in which acceleration events (generally or of specific classifications) occurred more often than in other areas;
b. Identifying times of day/year in which acceleration events (generally or of specific classifications) occurred more often than in other areas;
c. Identifying types of vessels for which acceleration events (generally or of specific classifications) occurred more often than in other areas;
d. Identifying weather conditions in which acceleration events (generally or of specific classifications) occurred more often than in other areas;
e. Identifying visibility conditions in which acceleration events (generally or of specific classifications) occurred more often than in other areas;
f. Identifying times of day/year in which acceleration events (generally or of specific classifications) occurred more often than in other areas;
g. Any combination of any one or more of the above (e.g., identifying that at a specific ports, vessels of certain types—e.g., size, displacement, mission—are likely to accelerate at specific weather conditions), and any other suitable criteria.

For example, the processing of step 520 may include any one or more of the following steps:

a. Data cleaning and preprocessing, including steps for addressing missing data (e.g., through techniques like mean imputation, regression-based imputation, or exclusion), normalization or standardization of data, encoding categorical variables, and any other process required to ensure compatibility of the data set with statistical or machine learning algorithms employed at step 520 or at later steps of method 500.
b. Feature engineering, including steps for creating composite variables and reducing dimensionality, such as: generating derived features, employing PCA for correlated variables, constructing interaction terms, or any other process required to improve interpretability and efficiency employed at step 520 or at later steps of method 500.
c. Exploratory data analysis (EDA), including steps for identifying patterns and relationships, such as: generating histograms, scatterplots, and heatmaps, identifying outliers, or any other process required to uncover key insights employed at step 520 or at later steps of method 500.
d. Hypothesis formulation, including steps for structuring analytical objectives, such as: stating null and alternative hypotheses, testing using chi-square or ANOVA, or any other process required to systematically evaluate relationships employed at step 520 or at later steps of method 500.
e. Statistical and machine learning analyses, including steps for pattern identification and prediction, such as: deploying regression models, clustering with DBSCAN, constructing decision trees, or any other process required to quantify relationships and outcomes employed at step 520 or at later steps of method 500.
f. Temporal and spatial analyses, including steps for analyzing time-based and geographic trends, such as: applying ARIMA for seasonality, spatial hotspot detection using GIS, or any other process required to understand contextual patterns employed at step 520 or at later steps of method 500.
g. Validation and robustness checks, including steps for ensuring reliability of models, such as: applying k-fold validation, sensitivity testing, adjusting clustering thresholds, or any other process required to verify stability and accuracy employed at step 520 or at later steps of method 500.
h. Interpretation and insights extraction, including steps for deriving actionable findings, such as: generating correlation matrices, calculating effect sizes, or any other process required to quantify and communicate results employed at step 520 or at later steps of method 500.
i. Visualization and communication, including steps for presenting findings, such as: creating geographic heatmaps, generating trend graphs, preparing concise reports, or any other process required to effectively convey results employed at step 520 or at later steps of method 500.
j. Iterative refinement, including steps for incorporating feedback and improving analysis, such as: integrating updated data, recalibrating models, re-evaluating parameters, or any other process required to enhance robustness and relevance employed at step 520 or at later steps of method 500.

Method 500 further includes step 530 of obtaining data—including at least navigation data—of a monitored marine vessel, indicative of a plurality of vessel acceleration events of the monitored marine vessel, the plurality of vessel acceleration events including at least a first vessel acceleration event and a second vessel acceleration event. The term "vessel acceleration event" is used to referred to acceleration events of the respective monitored marine vessel, but other than that they may be similar in nature to the acceleration events discussed above with respect to the historic acceleration data. Optionally, only events in which the acceleration event of the vessel meets a filtering criteria are analyzed in the following steps of method 500 (e.g., events in which the acceleration exceeds a certain velocity change threshold, a certain acceleration rate threshold, a certain duration, and so on). Optionally, the vessel acceleration events may pertain to a single voyage of the monitored marine vessel or to more than one voyage thereof. The data obtained at step 530 may pertain, for example, to any one or more of the parameters and types of data discussed above, e.g., collected in different locations along one or more voyages of the respective monitored marine vessel. Referring to the examples set forth with respect to the previous drawings, step 510 may optionally be executed by processor 220 and/or memory module 210.

It should be noted that step 520 can only start after stage 510 has also begun, other than that steps 510, 520, and 530 can be executed in any order, including being executed in parallel or partly in parallel. Furthermore, each of this steps may also be executed as a lengthy and/or recurring process in which new data is added to existing database, and is being processed together with the older data to update the databases and/or analysis results.

In method 500, focus is given to acceleration events, and to analyzing whether acceleration events of the monitored marine vessel are excessive acceleration events (e.g., resulting from a mistake by the crew) or mundane acceleration events (e.g., slowing down before entering a seaport), or intermediate event (for example, events in which acceleration was required, but could have been executed in a more efficient or optimized way). Assessing excessive fuel consumption by a marine vessel based on the process of method 500 requires such differentiation; simply quantifying the number, degree, or frequency of acceleration event of the monitored marine vessel, for example, would give a result which does not account for several of these acceleration event are actually mundane acceleration in which fuel could not have been significantly saved. The steps of method 500 discussed below demonstrate a process for analyzing actual acceleration events undertook by the monitored marine vessel, and assessing a degree to which the analyzed acceleration events of the monitored marine vessel could have been optimized.

Method 500 continues with executing steps 540 and 550 for each vessel acceleration event out of the plurality of vessel acceleration events. It should be noted that the analysis performed during these steps is not necessarily applied to all of the vessel acceleration events for which information was received, but it may be applied to a subgroup of these acceleration event, such subgroup being referred to as "the plurality of vessel acceleration event. For example, the data pertaining to acceleration events of the respective monitored marine vessel may be filtered to identify only acceleration events with significant effect on fuel consumption, only events in certain times and/or in certain geographic areas, and so on.

Events within the plurality of vessel acceleration events can be analyzed individually and/or as part of a batch, depending on the requirements of the specific implementation. For example, individual analysis may be employed to handle critical events or events of certain characteristics, while batch processing might be preferred for efficiency in scenarios involving a high volume of events. Statistical analysis or other computational techniques may be implemented, such as clustering-based methods, density-based methods, distance-based methods, probabilistic and statistical models, dimensionality reduction techniques, deep learning techniques, big data-specific approaches, or any other suitable big data processing techniques. Method 500 may also adapt dynamically, combining these approaches based on predefined conditions or criteria derived from the nature of the events or system constraints. While steps 540 and 550 are discussed primarily as pertaining to analysis of individual vessel acceleration events, it is noted that any form of batch analysis of vessel acceleration events may be implemented, mutatis mutandis.

Step 540 includes obtaining event contextual criteria of the respective vessel acceleration event. The obtaining of the event contextual criteria may be obtained as part of step 530, but may also optionally include processing data obtained at step 530 to generate the event contextual criteria. For example, step 540 may include processing information pertaining to the respective vessel acceleration event obtained at step 530 based on a classification, categorization, or another structured analysis scheme external to the information obtained at step 530. It is noted that such classification, categorization, or another structured analysis scheme may be the same one used in the generation of the historic acceleration analysis data at step 540, but this is not necessarily so. For example, translation or another way of bridging between the event contextual criteria obtained at step 540 to the event contextual criteria used in the historic acceleration analysis data of step 520 may optionally be executed as part of steps 550 and/or 560. Referring to the examples set forth with respect to the previous drawings, step 540 may optionally be executed by processor 220 and/or memory module 210.

For example, step 540 may include obtaining for the respective vessel acceleration event the following event contextual criteria: the event happened in [map cell #4,941], at [between 21:00-23:00], in [docking area of seaport], at certain [weather conditions], with the shipmaster being [Capt. Jane Fisher-Deckard], the ship having displacement of [amount in Tons], with [Identification of nearby vessels, maritime objects, and their kinematic data]. The number of event contextual criteria and their granularity may depend on factors such as the specific requirements of the fuel consumption system and/or method, the computational resources available, and the desired accuracy or precision of the analysis. For example, the number of event contextual criteria may range from a few, suitable for simple applications with limited scope, to thousands or more for complex systems requiring detailed and comprehensive fuel consumption analysis.

Step 550 includes estimating for the respective vessel acceleration evet an acceleration divergence from historic acceleration behavior, based on the event contextual criteria and on the historic acceleration analysis data. Referring to the examples set forth with respect to the previous drawings, step 550 may optionally be executed by processor 220 and/or memory module 210.

For example, the "acceleration divergence" calculated (or otherwise estimated) for the respective vessel acceleration event at step 550 may quantify the divergence of the vessel acceleration event from other acceleration events of the historic acceleration analysis data that share one or more event contextual criteria as the respective vessel acceleration event. By way of example, if 99% of all vessels slowed down at a specific map-cell (e.g., next to an entry of a maritime canal), having a vessel acceleration event in the same specific map-cell may be quantified as low divergence; if less than 1% of all vessels slowed down at a specific map-cell (e.g., at oceanic open waters away from busy trading routes), having a vessel acceleration event in the same specific map-cell may be quantified as high divergence; and if 15% of all vessels slowed down at a specific map-cell (e.g., at an area in which iceberg are occasionally observed), having a vessel acceleration event in the same specific map-cell may be quantified as high divergence.

However, additional event contextual criteria may change the picture provided in the last example. For example, while abrupt accelerations (e.g., slowing down) are rare on oceanic open waters, if the event contextual criteria indicates that the respective vessel acceleration event occurred next to a ship in distress, step 550 may indicate a low degree of divergence.

In at least some of the implementations of method 500, an aim of the analysis of the different vessel acceleration events may be regarded as "in the acceleration of the vessel—and the related fuel usage—merited. In such interpretation, an event in which fuel was used for merited acceleration is not considered wasteful, an event in which fuel was used for unmerited acceleration is considered wasteful, and in between cases may be classified based on a suitable evaluation scheme (which could be binary, categorical, ordinal, based on a continuous scoring system, or any other suitable evaluation scheme).

As mentioned above, while steps 540 and 550 may be implemented on an event-by-event basis, it is also possible to evaluate them in batches, in classes, and so on. A few examples for the output of the analysis of steps 540 and 550 for an imaginary set of vessel acceleration events numbered E1 . . . E7 include:

a. Binary evaluation scheme—Events E1, E3, and E4 are highly divergence compared to historic data ("wasteful"), and Events E2, E5, E6 and E7 are sufficiently similar to historic data ("not wasteful")
b. Categorical evaluation scheme—Events E1 and E3 are classified as "wasteful" E4 and E5 as "partly wasteful" and events E2, E6, and E7 as "routine".
c. Ordinal evaluation scheme—Events are ranked E1, E3, E4, E2, E5, E7, and E6 from most wasteful to least wasteful.
d. Continuous Scoring evaluation scheme—Event E1 is estimated to be 95% wasteful, event E2 is estimated to be 0% wasteful, event E3 is estimated to be 12.4% wasteful, and so on.
e. Non-specific Scoring evaluation scheme—about 7% of the events are highly wasteful, about 20% are medium level, and about 83% are merited. Note that such an evaluation scheme does not necessarily need to state, or event compute, evaluation for each individual event.

Step 560 of method 600 includes generating excess acceleration data for the monitored marine vessel based on the plurality of acceleration divergences estimated for the marine vessel, the excess acceleration data being indicative of degree of excess acceleration of the monitored marine vessel at the plurality of vessel acceleration events. Referring to the examples set forth with respect to the previous drawings, step 560 may optionally be executed by processor 220. Optionally, the excess acceleration data is indicative of estimated excess fuel usage by the monitored marine vessel.

It is noted that while method 500 was discussed above as a method for fuel management and/or assessment, the same method 500 may be implemented, mutatis mutandis, in order to gain insight, affect decisions and/or trigger actions related to fields other than fuel management. For example, analysis of divergence of acceleration events from historic records based on certain criteria (as discussed above) may also be used in field like safety assessment, personnel qualification assessment, sensor and environment awareness systems, and so on.

The excess acceleration data may take different forms, such as (but not limited to):

a. Event-by-event analysis of individual events to assess excess acceleration, excess fuel usage, and/or acceleration related safety assessment related to each vessel acceleration event.
b. Aggregate statistical analysis of multiple acceleration events to identify overarching trends, averages, or deviations from expected maneuvering.
c. Identification and analysis and/or documentation of acceleration events where excess acceleration, excess fuel usage, and/or acceleration related safety assessment is deemed noteworthy, possibly including potential causative factors analysis.
d. Insights regarding patterns or systemic discrepancies in excess acceleration, excess fuel usage, and/or acceleration related safety assessment.
e. Comparative analysis between different marine vessels, individuals, geographic area, and so forth, to evaluate relative excess acceleration, excess fuel usage, and/or acceleration related safety.
f. Visualizations such as charts, heatmaps, or other graphical representations summarizing any of the above.
g. Recommendations for adjustments or improvements to predictive methodologies relating to excess acceleration, excess fuel usage, and/or acceleration related safety.

It should be noted that while method 500 was discussed above as a method for fuel management and/or assessment that is based on analysis of a plurality of acceleration events that are associated with a single marine vessel, the same method 500 may be implemented, mutatis mutandis, to a plurality of acceleration events that are all associated with an entity other than a marine vessel, such as— a. One or more crew members operating different marine vessels (e.g., indicative of fleet members who are better or worse at conservative fuel usage);
b. A country, geographic area, or a jurisdiction (e.g., indicative of whether there is an above average number of incidents of excessive acceleration in the waters of a specific country);
c. Seaport (e.g., indicative of whether there is an above average number of incidents of excessive acceleration in or next to a specific seaport);
d. Marine vessel class (e.g., indicative of whether smaller ships in a fleet experience more unmerited acceleration than the larger ships of the fleet).

It should be noted, of course, that method 500 may be implemented to more than one monitored marine vessel. Optionally, information pertaining to two or more monitored marine vessels could be executed in a synergetic fashion, in which information pertaining to acceleration events (and possibly to additional data, e.g., as discussed above) would provide better insights into fuel consumption and fuel management by the respective monitored marine vessels. For example, analyzing fuel consumption of monitored marine vessels which had the same shipmaster and/or the same chief officers, at different times may give more insights to the fuel consumption related behavior of that person, and whether it can be improved.

It is noted that method 500 may be implemented in many formats and for many types of uses, such as (but not limited to):

a. Offline analysis, e.g., conducting comprehensive and possibly resource-intensive processing on pre-collected data for deeper insights.
b. Batch analysis, e.g., collecting data over a defined period or for a certain number of acceleration events, and processing the data in chunks, suitable for example for periodic reporting or aggregate assessments.
c. Historical analysis, e.g., focusing on archived data to identify patterns, trends, and insights from past events.
d. Deferred analysis, e.g., delaying data processing until specific conditions or triggers are met, optimizing for resource use or timing.
e. Real-time analysis, e.g., processing data as it is generated, enabling immediate insights and decision-making, alerting of crew members and/or fleet managers, autonomously or semi-autonomously maneuvering the marine vessel, and so on.
f. Real-time predictive analysis, e.g., assessing possible outcomes and/or excessive acceleration for an unfolding situation and for proactive planning, e.g., leveraging live data streams.
g. Offline predictive analysis, e.g., estimating the number of events or trends for future periods, such as forecasting the excess fuel cost for next year, allowing for proactive planning.
h. Real-time simulation, e.g., leveraging live data to test and evaluate potential scenarios or decision pathways dynamically.

Method 500 may also include storing of the excess acceleration data and/or any intermediate result of the different steps of method 500 on one or more memory units (e.g., system record, database). Where appropriate, this step may be repeated at different stages of the method to ensure the dataset reflects the most recent insights. Referring to the examples set forth with respect to the previous drawings, this step may optionally be executed by processor 220 and/or memory module 210.

Referring to method 500 as a whole, e.g., especially to steps 540 and 550, it is noted that location of a certain vessel acceleration event may be designed to make a significant difference in assessing a divergence of the respective vessel acceleration event from historic acceleration behavior, e.g., as discussed above. For example, under the following assumptions:

a. The first vessel acceleration event includes deceleration of the monitored marine vessel at a first deceleration degree (e.g., a certain rate of slowing down, a certain overall speed reduction, and/or a certain duration of deceleration) and it occurs at a first location corresponding to first location criteria (e.g., open seas);
b. The second vessel acceleration event includes deceleration of the monitored marine vessel at a second deceleration degree that is a greater deceleration degree than the first deceleration degree and it occurs at a second location corresponding to second location criteria differing than the first location criteria (e.g., located at a seaport or other historic congestion hotspot), Despite the second deceleration degree being greater than the first deceleration degree, method 500 may nevertheless include:

a. Estimating substantial divergence from historic acceleration behavior for the first vessel acceleration event based on the first location criteria; and
b. Estimating insubstantial divergence from historic acceleration behavior for the second vessel acceleration event based on the second location criteria.

It should be noted that this behavior may be demonstrated and be in accordance with the design of at least some implementations of method 500 also in cases in which the first acceleration event and the second acceleration event may be similar (e.g., fall under the same event criteria classification) in any one or more other significant event contextual criteria (e.g., resulting from a similar safety concern, in similar visibility conditions, with similar ship displacement, and so on).

Referring to method 500 as a whole, e.g., especially to steps 540 and 550, it is noted that relation of a vessel acceleration event to a nearby function, facility, object, etc., may be designed to make a significant difference in assessing a divergence of the respective vessel acceleration event from historic acceleration behavior, e.g., as discussed above. For example, in case the first location criteria is indicative of the first vessel acceleration event occurring at open seas, and the second location criteria is indicative of the second vessel acceleration event occurring within a predetermined distance range (e.g., 0-1 NM, 0-3 NM, 0-12 NM) from a seaport or any other function, facility, object (e.g., rig, tanker). For example, in case the first location criteria is indicative of the first vessel acceleration event occurring at open seas, and the second location criteria is indicative of the second vessel acceleration event meeting a predetermined seaport proximity criteria indicative of a degree of proximity of the first vessel acceleration event to a seaport. The seaport proximity criteria may be defined by a predetermined distance threshold (e.g., under 12 NM, under 3 NM), by a dynamically defined distance threshold (e.g., being responsive to visibility conditions and/or to time of the day), and so on.

Referring to method 500 as a whole, e.g., especially to steps 540 and 550, it is noted that congestion conditions at the time of a vessel acceleration event or within a predetermined duration before it may be designed to make a significant difference in assessing a divergence of the respective vessel acceleration event from historic acceleration behavior. For example, one or more contextual criteria utilized with respect to at least one vessel acceleration event out of the plurality of vessel acceleration events may be further indicative of congestion in a vicinity of the monitored marine vessel during the respective vessel acceleration event; and step 550 may include estimating the acceleration divergence further in response to the congestion. By way of example, historic congestion may optionally be provided from analysis of data of historic ship voyages, or simply from knowing where ports are located. Continuing the same example, method 500 may implement standards according to which the marine vessel is expected to slow down in conditions of congestion, or when congestion is expected to possibly happen. Optionally, the first vessel acceleration event may include deceleration of the monitored marine vessel at a first deceleration degree, the second vessel acceleration event may include deceleration of the monitored marine vessel at a second deceleration degree that is a greater deceleration degree than the first deceleration degree and instances of step 550 may include: estimating substantial divergence from historic acceleration behavior for the first vessel acceleration event and estimating insubstantial divergence from historic acceleration behavior for the second vessel acceleration event, based on the second vessel acceleration event occurring at a less congested sea scenario than the first vessel acceleration event.

Optionally, sensors of the monitored marine vessels may provide data that is used for determining certain of the event contextual criteria of one or more of the vessel acceleration events analyzed in method 500. Such sensor-based event contextual information may include, for example, information related to visibility conditions, weather conditions, congestion, distance to other maritime objects, and so on. For example, optionally the obtained historic navigation data may be further indicative of environmental statuses in different parts of the past voyages of the respective marine vessels determined based on environmental sensor data collected by at least one external environment monitoring sensor (e.g., camera, radar) onboard the respective marine vessel, and the processing includes generating the historic acceleration analysis data that is further indicative of correlation between prevalence of acceleration events and event contextual criteria including sensor based environmental statuses. It is noted that processing of the sensor data from the marine vessel (or from external sensors, e.g., as discussed above with respect to system 200) may be executed on the monitored marine vessel, on shore (e.g., in a fleet control center), in combination of both, or in any other way. It is noted that processing of the sensor data may be done in real-time or near real-time, but this is not necessarily so.

Optionally, safety event status associated with a vessel acceleration event may affect the acceleration divergence estimated for that event. Optionally, method 500 may include obtaining for at least one vessel acceleration event out of the plurality of vessel acceleration events the contextual criteria that is further indicative of a safety event status of the monitored marine vessel during the respective vessel acceleration event (e.g., at steps 530 and/or 540), and estimating the acceleration divergence further in response to that safety event status. For example, for an acceleration event of an abrupt slowing down of the monitored marine vessel, an analysis of that marine acceleration event may deem that event a merited acceleration if the contextual criteria of that event is indicative that the acceleration event is associated with a surprising unforeseeable safety event (e.g., someone fell to the water, or a mechanical system broke down). The contextual criteria may be further indicative of other data regarding the safety event (which is then taken into consideration), e.g., how long before the safety event was it first noticed.

The outputs of step 560 (as well as these of any other step of method 500) may be put to different uses, such as estimation of the cost involve in inefficient or unmerited acceleration, changing operational parameters of one or more systems of the monitored marine vessel (or of supervisory systems supervising its operations), and so on.

For example, method 500 may further include estimating for one or more of the vessel acceleration events multiple optional divergence scenarios for the monitored marine vessel—e.g., in view of at least the safety event status—and assessing for the monitored marine vessel at least one of (a) the acceleration divergence and (b) excess fuel consumption, for the respective vessel acceleration event—based on analysis of the optional divergence scenarios. For example, any combination of one or more steps of method 600 may be included in this assessment, mutatis mutandis.

For example, method 500 may further include generating one or more recommendations for navigation of the monitored marine vessel, based on the excess acceleration data and/or on the result of any preceding step of method 500. Likewise, method 500 may optionally include generating one or more recommendations for navigation of another marine vessel (e.g., manned by one or more crewmembers of the monitored marine vessel), based on the excess acceleration data and/or on the result of any preceding step of method 500. Such recommendations may be generated based on real-time data of a present voyage of the respective marine vessel (e.g., in previous voyages this marine vessel/crewmember were slow to react to similar situations in similar visibility conditions, and therefore an alert may be issued to encourage them to change route or slow down), but this is not necessarily so. for example, the recommendation may be made before the respective marine vessel even embarked on its future voyage, in the course planning stage (e.g., in previous voyages this marine vessel/crewmember were slow to react to fishing boats, and therefore a course could be planned for its future voyage, which is further than usual from fishing boats hotspots).

Optionally, recommendations may be generated based on real-time data of the monitored marine vessel (or another marine vessels, e.g., as discussed above). For example, the generating of recommendations may be further based on location of the monitored marine vessel within a predefined time period (e.g., up to 1 minute, up to 10 minutes, up to an hour) prior to the generating of the recommendation. Such a recommendation may be based on the excess acceleration data and/or on the historic acceleration analysis data. For example, a recommendation may be issued in case the respective marine vessel is nearing a location in which the same monitored marine vessel and/or a significant number of other ships have reduced sailing velocity quickly, and may include a recommendation for detouring around the problematic area and/or to slow down to a certain degree (thus preventing a more drastic reduction of velocity at a later point). The predefined time period may be determined, for example, based on the velocity of the marine vessel, its ability to change course and/or to decelerate, and the likelihood of occurrence of an event (e.g., safety event, weather event) in which deceleration will be required. For example, the predefined time period selected for a fishing boat that implements method 500 may be much shorter than the one set for a cargo liner that is much slower to respond to events, and should therefore be prepared far in advance.

Optionally, method 500 may include generating a recommendation (e.g., according to any one or more of the use cases and options discussed above) further based on environmental sensor data collected by at least one external environment monitoring sensor (i.e., pertaining to occurrences around the marine vessel, e.g., a camera or a radar looking to the sea around the marine vessel) onboard the monitored marine vessel within predefined time period (e.g., up to 1 minute, up to 10 minutes, up to an hour) prior to the generating of the recommendation.

Optionally, method 500 may include generating a recommendation based on safety status associated with one or more vessel acceleration event and/or with the monitored marine vessel. Optionally, method 500 includes generating one or more recommendations further based on safety event status of the monitored marine vessel within predefined time period (e.g., up to 1 minute, up to 10 minutes, up to an hour) prior to the generating of the recommendation.

Optionally, method 500 may include generating a recommendation based on voyage efficiency data associated with one or more vessel acceleration event and/or with the respective voyage of the monitored marine vessel. Optionally, method 500 includes generating one or more recommendations further based on voyage efficiency data for a present voyage of the monitored marine vessel, the voyage efficiency data including voyage scheduling data. For example, even though cargo ships generally operate on tight schedules, method 500 may include generating the recommendation for maneuvering (e.g., turning, accelerating) the monitored marine vessel based on obtained data that is indicative of the monitored marine vessel having sufficient time to harbor, so it can relax its sailing velocity.

It is noted that method 500 may issue a recommendation for a monitored marine vessel based on outputs of any one or more of steps 510-560 and possibly also based on data pertaining to the monitored marine vessel or the crew manning the monitored marine vessel. For example, method 500 may include generating the recommendation based of information indicative of any one or more of the following acceleration-associated types of events:

a. Navigation and Maneuvering related, e.g., near reefs, rocks, or shallow waters; approaching docks, marinas, or harbors; navigating narrow or crowded channels.
b. Weather and Environmental Conditions related, e.g., avoiding rough seas, high winds, or storms; adjusting for tidal flows or currents; navigating polar regions or avoiding icebergs.
c. Safety and Mechanical Issues related, e.g., handling mechanical or engine problems; avoiding capsizing in rough weather; stabilizing the ship for medical emergencies.
d. Loading, Unloading, and Gear Deployment related, e.g., deploying or retrieving fishing gear; loading or unloading vehicles, passengers, or cargo; ballast operations during cargo adjustments.
e. Wildlife and Marine Life Concerns related, e.g., avoiding whale migration zones or pods; minimizing ship noise for acoustic studies; avoiding disturbance of marine mammal life.
f. Visibility related, e.g., reducing speed in fog, nighttime, or heavy rain.

g. Traffic Management related, e.g., maneuvering in high-density traffic routes or port congestion; avoiding collisions in busy straits.

h. Scientific and Research Purposes related, e.g., collecting water, sediment, or biological samples; deploying submersibles, sensors, or buoys; operating at controlled speeds for seismic surveys.

i. Assistance and Rescue related, e.g., stabilizing to assist survivors or man-overboard situations; towing or assisting smaller vessels; search and rescue operations.

j. Legal and Regulatory Compliance related, e.g., adhering to speed limits near coastlines; slowing in piracy-prone regions for security checks; navigating emission control areas.

Recommendations generated by execution of method 500 may take any useful form. For example, recommendations for maneuvering that may be provided by method 500 (e.g., by a marine navigation recommendation system executing it) may include any one or more of the following:

a. Adding more lookout personnel to ensure comprehensive situational awareness.

b. Altering the ship's course to avoid hazards or comply with navigation requirements.

c. Adjusting speed to maintain safety or efficiency under prevailing conditions.

d. Proceeding to specified waypoints as part of a newly planned route.

e. Reporting sightings of hazards or critical conditions (e.g., icebergs, marine life) to shore or other vessels.

f. Acknowledging entry into designated areas with updates on local weather, quay assignments, or operational requirements.

g. Contacting the port pilot on specified bearings via designated communication channels (e.g., channel 16).

h. Slowing down due to low visibility conditions, with system-generated time-stamped alerts.

i. Tracking objects or altering course when no manual input is detected for extended periods.

It is noted that such recommendations (and others, as discussed above) may be generated in method 500 in response to analysis in method 500 of data pertaining to specific crewmembers and/or to a specific state of the monitored marine vessel. For example, method may include generating a recommendation to the monitored marine vessel in a certain safety event (e.g., another ship is detected 5 km away) if certain people man the monitored marine vessel, while it would determine not to issue such a recommendation if people who proved themselves as more alert and safety-minded are in the crew (e.g., setting the distance alert threshold to a distance shorter than 5 Km). In another example, a different recommendation would be given in case the monitored marine vessel is heavily loaded than the recommendation that would be given in the same situation of the displacement of the monitored marine vessel was smaller (e.g., more lightly loaded ship).

It is noted that in some situations, e.g., in autonomous or semi-autonomous marine vessels, in remote-controlled marine vessels, or in manned marine vessels in which some systems are controllable by computers, method 500 may include operating the monitored marine vessel based on the excess acceleration data generated for the monitored marine vessel at step 560 and/or on any other result of any one or more step of method 500. Optionally, method 500 may include modifying—or otherwise triggering the modification of—operational parameters of maneuvering systems of the monitored marine vessel, based on the excess acceleration data generated for the monitored marine vessel at step 560 and/or on any other result of any one or more step of method 500, in order to change a course of the monitored marine vessel and/or in order to change a sailing velocity of the monitored marine vessel. Optionally, method 500 may include operating, modifying operational parameters, controlling, or otherwise affecting the operation of sensors or other systems installed on the monitored marine vessel, based on the excess acceleration data generated for the monitored marine vessel at step 560 and/or on any other result of any one or more step of method 500, in order to response to changing situations, given the information learnt in method 500 regarding the monitored marine vessel and/or its crew. For example, all of the operations, control signals, commands, outputs, instructions, and so on issued based on the processed described in the present paragraph may be issued in response to any one of the aforementioned situations and conditions discussed above with respect to making recommendations, mutatis mutandis.

For example, method 500 may include controlling, operating, and/or otherwise affecting the operations of any one or more of the following ship systems, based on outputs of any one or more steps of method 500 and optionally data pertaining to the monitored marine vessel, the crew, and so on (e.g., as discussed above): navigation systems (e.g., GPS and autopilot for course adjustments), propulsion control systems (e.g., throttling engines or activating reverse thrust), steering systems (e.g., rudders and course altering thrusters), radar and sonar modules (e.g., detecting obstacles or other vessels), environmental sensors (e.g., weather and ocean current monitoring), collision avoidance systems (e.g., AIS or LIDAR for identifying potential hazards), ballast management systems (e.g., for stability during diversions), and communication systems (e.g., coordinating with other vessels or ports), alarm thresholds, safety distance thresholds.

It is noted that method 500 may be implemented to generate excess acceleration data (e.g., fuel efficiency data) for many marine vessels of a fleet. This may allow comparison of different marine vessels, comparison of different crews (or specific crew members), comparison of performance of the same marine vessel over time (e.g., as a metric for triggering an alert that something may be wrong). Likewise, generation of excess acceleration data for multiple marine vessels of a fleet can also be used to provide statistics or other aggregative data for the entire fleet (or categorized parts of the fleet).

In various maritime scenarios, it is imperative for a marine vessel to reduce its speed or alter its course to ensure navigational safety and prevent hazardous incidents. Such situations may arise due to the risk of collision with other vessels, the necessity to navigate around treacherous sea areas during adverse weather conditions, or the need to comply with maritime traffic regulations in congested waters. These safety-critical events demand precise and timely actions to safeguard both the vessel and its surroundings. Preempting the course setting in response to such a safety event can improve fuel consumption, maintaining of propagation velocity, and possibly also time to destination.

It is noted that marine vessels tends to move relatively slowly (e.g., compared to motorized land transportation), identify other marine vessels or maritime objects in relatively large distances (e.g., over 1 Km, over 5 Km), have little other objects or interference between the ship and another object or marine vessel in the sea, and have many possible routes which it can undertake (as it is usually not confined to roads or other mandatory routes). Therefore, upon determining that an event or an object may require deviation from its course and/or from its present sailing velocity, system 200 may process data available to it (e.g., from memory module 210, from sensors 250, and so on) in order to make recommendations, determine, or otherwise affect the course and/or the velocity of marine vessel 100, especially with regard to the aforementioned event or object.

Figure 6:
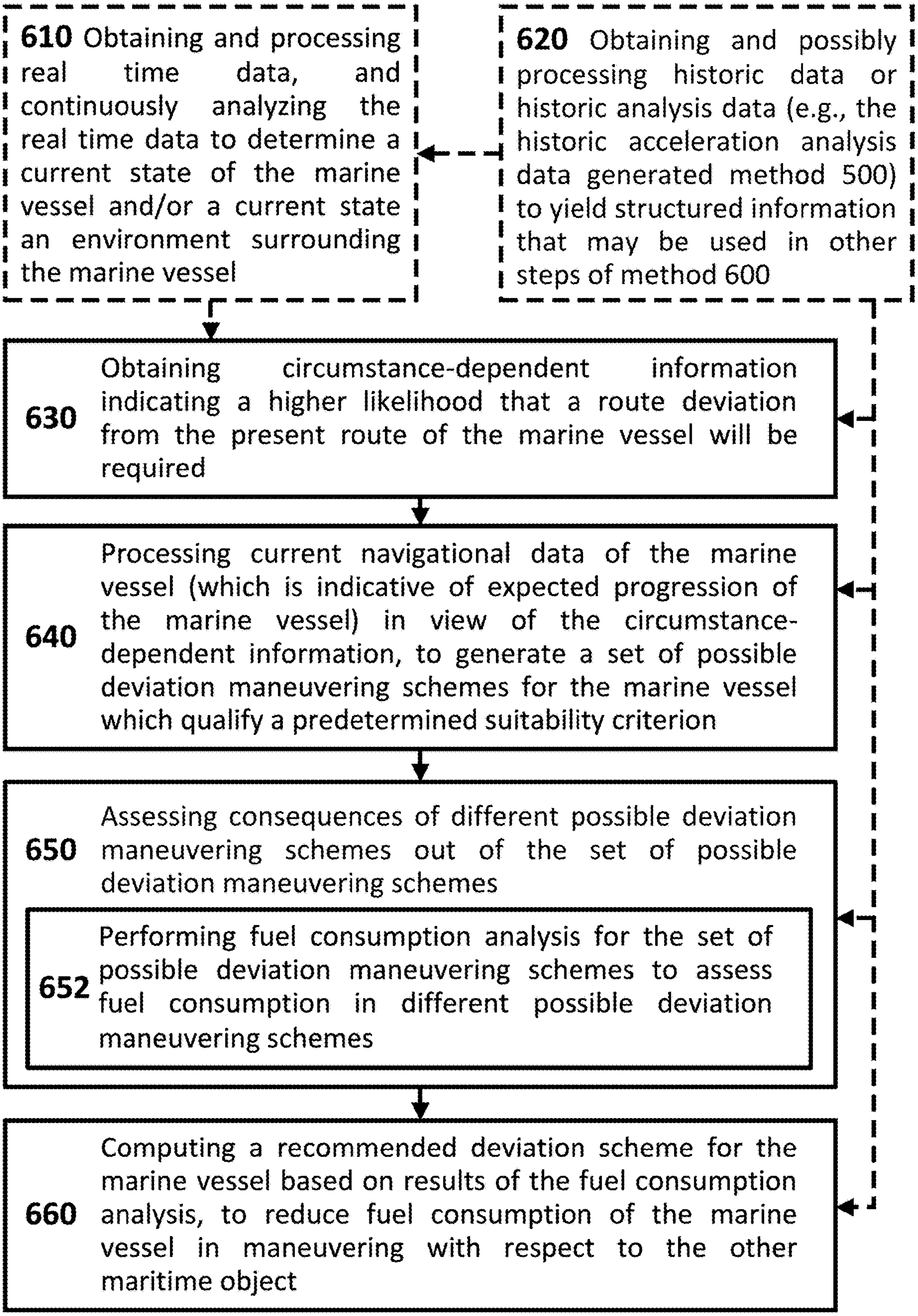
FIG. 6 is a flow chart illustrating an example of a computer-implemented method for improving fuel consumption of a marine vessel.

FIG. 6 is a flow chart illustrating an example of method 600, in accordance with the presently disclosed subject matter. Method 600 is a computer-implemented method for improving fuel consumption of a marine vessel. Referring to the examples set forth with respect to the previous drawings, method 600—as well as any individual step of it—may optionally be carried out by processor 220, e.g., with the help of any one or more of other components of system 200 like memory module 210, communication module 230, and so on. Method 600 includes executing on a processor at least steps 610, 630, 630, and 640, as well as optionally executing on the processor any one or more other optional step of method 600 as discussed below. The processor executing method 600 may include one or more processing units, communicating between them in wired and/or wireless manner, e.g., as discussed above with respect to processor 220. It is noted that method 600 may implement any feature, functionality, or variation discussed above with respect to system 200 and to any component thereof.

Step 630 of method 600 includes obtaining circumstance-dependent information indicating a higher likelihood that a route deviation from the present route of the marine vessel will be required. For example, the circumstance-dependent information may be real time information or real near time information (e.g., up to 1 minute, up to 10 minutes, up to an hour). The circumstance-dependent information may be obtained from sensors onboard the marine vessel, from another marine vessel, from an onshore system or person (e.g., from a fleet control center), from processing of data by a computer on the ship, and so on. The circumstance-dependent information may include any suitable type of data, such as any one or more of the following types of data, such as raw sensor data, processed sensor data, geographic and mapping data, radio messages, computer communication messages, and so on. Referring to the examples set forth with respect to the previous drawings, step 630 may optionally be executed by processor 220 and/or memory module 210. For example, the circumstance-dependent information may include any one or more of the following types of information:

a. Collision alert, such as safety information indicative of indicative of an increased likelihood for collision of the marine vessel with another maritime object;
b. Weather-related conditions, such as: approaching storms, hurricanes, dangerous wave heights, ice formations, fog banks, and extreme winds.
c. Navigation hazards, such as: floating containers, recently reported shallow waters, newly identified reef formations, and reported shipwrecks.
d. Maritime traffic situations, such as: heavy shipping lane congestion, military exercises, piracy activity reports, and special maritime events.
e. Port and infrastructure issues, such as: port closures, lock or canal maintenance, and bridge malfunctions.
f. Emergency situations, such as: medical emergencies requiring diversion, mechanical problems requiring shelter, search and rescue obligations, and environmental hazards.
g. Regulatory and political developments, such as: changes in territorial water restrictions, new sanctions affecting port access, armed conflicts, and temporary military exclusion zones.
h. Marine wildlife conditions, such as: whale migration routes, dense mammal congregations, protected species presence, breeding ground activities, seal rookeries, and unusual pod movements.

FIG. 7 illustrates several optional substeps of step 630, in accordance with examples of the presently disclosed subject matter. It is noted that optionally, method 600 (or parts thereof) may be repeated for responding to different events unfolding during a voyage of the marine vessel. In such cases, different events may correspond to the various types of events exemplified above. In some events, different types of events may pertain concurrently (for example, if detour is required in order to avoid colliding with another ship, while various swaths of sea experience different visibilities levels and different reef depth. Step 630 (or various instances thereof) may include any one or more of the following optional steps:

a. Optional step 631 of obtaining safety information that is indicative of an increased likelihood for collision of the marine vessel with another maritime object.
b. Optional step 632 of obtaining weather-related information indicative of hazardous weather, such as approaching storms, hurricanes, dangerous wave heights, ice formations, fog banks, and overly strong winds. Optionally the alert of optional step 632 may be provided in response to analysis of high-resolution weather data taken from the marine vessel systems, to provide localized alerts, e.g., using generative artificial intelligence or other AI systems.
c. Optional step 633 of obtaining navigation hazard information indicative of obstacles or risks to navigation, such as floating containers, shallow waters, reef formations, etc.
d. Optional step 634 of obtaining maritime traffic situation information indicative of congestion or unusual activity, such as heavy shipping lane congestion, military exercises, piracy activity reports, and special maritime events. It is noted that the maritime traffic situation information may pertain to historic information—e.g., based on analysis of historic databases such as the historic navigation data of method 500. For example, a reason for such a historic analysis based traffic situation information may be identifying that while there is no apparent reason for a surprising event at the present, many ships required to slow down abruptly in the past in this location, and therefore it may be advisable to slow down a bit, to improve the response maneuvering envelope in case of surprise event, and prevent a more drastic deceleration should a surprising event occur.
e. Optional step 635 of obtaining port and infrastructure information indicative of operational disruptions, such as port closures, lock or canal maintenance, and bridge malfunctions.
f. Optional step 636 of obtaining emergency situation information indicative of critical situations requiring immediate action, such as medical emergencies requiring diversion, mechanical problems requiring shelter, search and rescue obligations, and environmental hazards.
g. Optional step 637 of obtaining regulatory and political information indicative of jurisdictional changes, such as changes in territorial water restrictions, new sanctions affecting port access, armed conflicts, and temporary military exclusion zones.
h. Optional step 638 of obtaining marine wildlife condition information indicative of ecological considerations, such as whale migration routes, dense mammal congregations, protected species presence, breeding ground activities, seal rookeries, and unusual pod movements.

Optionally, a system that executes method 600 (e.g., an onboard system 200) or a supervisory system (e.g., an onshore system 200 or another supervisory system) may automatically detect when the marine vessel enters regulatory zones (e.g., SECA, MARPOL) and issues alerts related to environmental compliance, emission controls, or protected areas (e.g., whale protection zones). Such alerts may include detailed action steps to ensure compliance.

Optionally, various types of circumstances-dependent information may be obtained from other marine vessels or other external systems (e.g., using ship-to-ship and/or ship-to-shore real-time data communication (e.g., regarding congestion, storms, accidents, route changes). Such peer-to-peer network helps vessels collaborate, ensuring they are informed of any unexpected events, increasing overall safety. That may include utilizing NAVTEX data (NAVigational TEleX) to receive emergency alerts, such as navigational warnings, meteorological warnings, ice reports, pollution reports, man overboard (MOB) alert, collisions alerts, and so on.

Referring to the different types of circumstance-dependent information, it is noted that all of them may result either from real-time events or real-time analysis and/or from historic data—e.g., based on analysis of historic databases such as the historic navigation data of method 500. The historic data used may pertain to the respective marine vessel, or to a larger number of marine vessels. Such historic-analysis circumstance-dependent information may depend indirectly on current circumstances. For example, a previous deviation from the original course of the marine vessel may require re-evaluation of historic accelerations or other historic events (e.g., historic whale migration routes). For example, change in the operational state of one or more ship systems (e.g., radar range, rudder turning capabilities) may require re-evaluation of the response capabilities of the marine vessel to possible future events, and may require changing of route, of sail speeds, etc.

Reverting to FIG. 6, it is noted that method 600 may include optional step 610 of obtaining and processing real time data, and continuously analyzing the real time data (optionally in view of historic data and/or other databases) to determine a current state of the marine vessel and/or a current state an environment surrounding the marine vessel (e.g., other marine vessels, maritime objects, shore, reefs, see, weather). Method 600 may also include collecting at least some of the data processed in optional step 610 (e.g., by one or more sensors, by logging ship systems), but this is not necessarily so, and the data may be obtained in any other suitable fashion, e.g., from other systems. The rates in which the real-time data is collected, obtaining, updated, and/or processed may differ between implementations, and even between different parts of the same journey of the marine vessel. For example, higher power and/or computational resources may be directed to execution of step 610 in times in which dangerous unforeseen events are more likely, at times in which they are in greater availability, and so on.

Method 600 may include optional step 620 of obtaining and possibly processing historic data or historic analysis data (e.g., the historic acceleration analysis data generated method 500) to yield structured information that may be used in the processing of any one or more of the other steps of method 600 (e.g., any one or more of steps 610, 630, 640, 650, and 660). Examples of types of data that may be included obtained and/or generated at step 620 include any combination of any one or more of the following: acceleration data (e.g., historical measurements of acceleration, including peak, average, and time-series data), velocity profiles (e.g., changes in velocity over time), positioning data (e.g., GPS or other spatial positioning data for identifying historical locations and trajectories), environmental data (e.g., weather conditions, temperature, humidity, and other environmental factors associated with the historic events), sensor calibration data (e.g., records of calibration settings and errors from associated sensors), operational parameters (e.g., historic configurations, operational states, or settings of equipment during prior processes), failure logs (e.g., documented incidents, malfunctions, or anomalies), maintenance records (e.g., maintenance schedules, performed repairs, and associated timelines), energy consumption data (e.g., logs of power usage, including spikes and averages, correlated with operational phases), system diagnostics (e.g., historical diagnostics data from systems or subsystems), user inputs (e.g., any user-provided inputs or commands during previous operations), image or video data (e.g., visual records captured during prior operations or experiments), statistical data (e.g., aggregated metrics, distributions, and trend analyses), material properties data (e.g., data regarding the physical properties of materials used in prior processes), contextual metadata (e.g., metadata that provides contextual insights such as timestamps, geotags, or equipment identifiers), process parameters (e.g., historical settings and conditions under which specific processes were conducted), and external data sources (e.g., third-party data inputs, including industry benchmarks or research data relevant to the operation). These data types may be utilized to enhance the accuracy, relevance, and adaptability of method 600 by informing one or more of its processing steps, thereby contributing to optimized performance or predictive analysis. Method 600 may also include collecting at least some of the data processed in optional step 620 (e.g., by one or more sensors over time, by logging ship systems over time), but this is not necessarily so, and the data may be obtained in any other suitable fashion, e.g., from other systems. The rates in which the data obtained at step 620 is updated and/or processed may differ between implementations, and even between different parts of the same journey of the marine vessel.

Step 640 of method 600 includes processing current navigational data of the marine vessel (that is indicative of expected progression of the marine vessel) in view of the circumstance-dependent information (e.g., the safety information) obtained at step 630, to generate a set of possible deviation maneuvering schemes for the marine vessel which qualify one or more predefined suitability criterion (e.g., a collision prevention safety criterion, in the case of safety information indicative of an increased likelihood for collision being obtained at step 630).

The set of possible deviation maneuvering schemes generated for the marine vessel may pertain to routes, velocities, timings, and/or accelerations of the marine vessel, as all of these criteria may affect the computation of the recommended deviation scheme at step 660. Additional information may also be generated for the set of possible deviation maneuvering schemes, pertaining to other factors which may affect such a decision, such as risk assessment, adjacency to various key locations of interests, communication availability, distance from other marine vehicles (as well as relative locations, velocities, and accelerations), and so on. The set of possible deviation maneuvering schemes may identify individual possible deviation routes and/or individual possible deviation schemes, but this is not necessarily so. for example, some options may be defined in a parametric form (e.g., sailing for a distance of between 2-4 NM in a direction between 322°-354°, and then turning left between 3°-4.5° until returning to planned course), in which the specific values for the recommended deviation scheme may be determined at a later step of method 600. The set of possible deviation maneuvering schemes may define the set of possible deviation maneuvering schemes using static coordinates such as World Geodetic System 1984 (WGS84) or Universal Transverse Mercator (UTM), using coordinates relative to the marine vessel, the other marine vessel (e.g., in case of likelihood of collision), and so on (e.g., relative bearings such as 10° starboard, 5 nautical miles at 270° from point x), and so on. In case the set of possible deviation maneuvering schemes pertain to deviation maneuvering schemes which are intended to avoid collision with another marine vessel, the deviation maneuvering schemes pertain to deviation maneuvering with respect to the other marine vessel or maritime object.

Figure 9A:
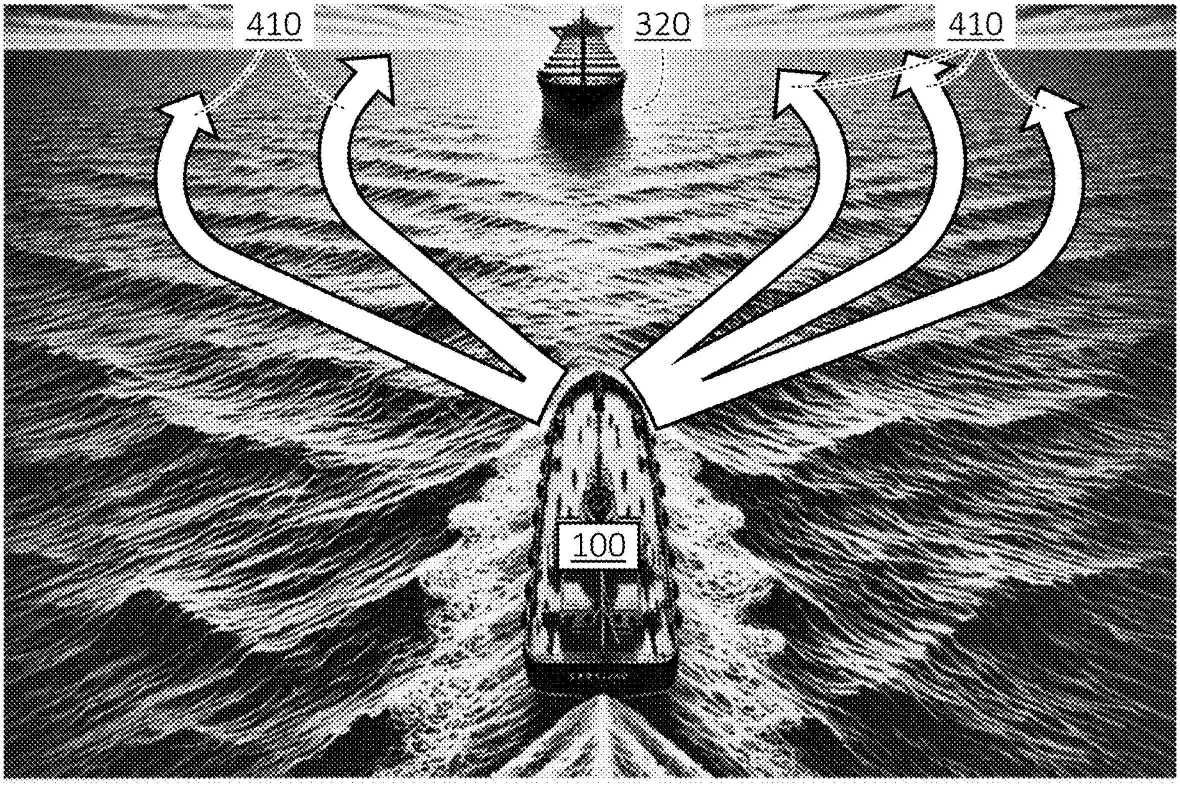
FIGS. 9A and 9B are illustrations exemplifying a set of possible deviation maneuvering routes computed for a marine vessel.
Figure 9B:
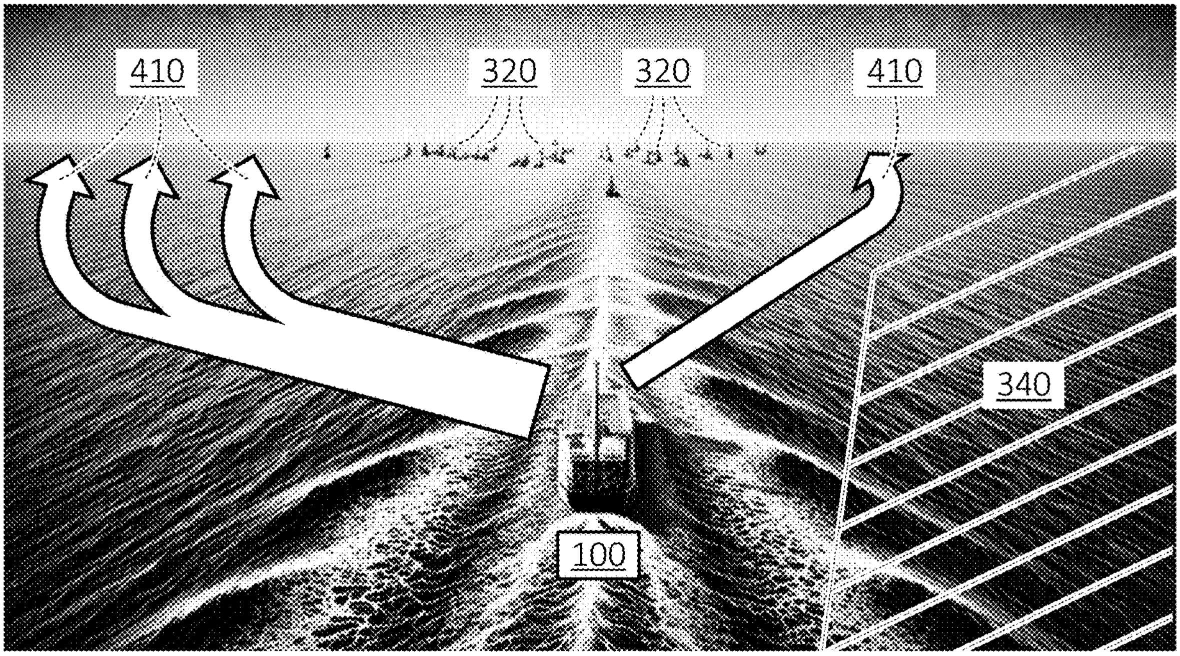

FIGS. 9A and 9B are illustrations exemplifying a set of possible deviation maneuvering routes 410 computed for marine vessel 100, in accordance with examples of the presently disclosed subject matter. In the examples of FIGS. 9A and 9B, the set of possible deviation maneuvering schemes (indicative, for example, of set of possible deviation maneuvering routes as well as planned sailing velocities and accelerations for the respective routes) is generated in order to reduce the likelihood of collision (or even a near pass) with the at least one other marine vessels 320 for which circumstance-dependent information was received. As exemplified in FIG. 9B, the generated set of possible deviation maneuvering schemes may be affected not only by information pertaining to the cause of the hazard (e.g., marine vessels 320) but also with respect to other information which may be either real-time, nearly real-time, or static information. In the illustrated example area 340 is a geographically defined area in which marine vessels of the class of marine vessel 100 are prohibited from sailing.

Reverting to FIG. 6, the phrase "current navigational data of the marine vessel" pertains to data that pertains to the course of the marine vessel (sailed course, present bearings, and/or planned future course) and possibly to other navigational or navigational-related data (e.g., possible maximum speed at the present, possible turning rate at the present). For example, the current navigational data may pertain to a predefined time period (e.g., up to 1 minute ago, up to 10 minutes ago, up to an hour ago). It is noted that older navigational data of the marine vessel may also be optionally obtained and utilized. Furthermore, the generating of the set of possible deviation maneuvering schemes based on the current navigational data and in view of the circumstance-dependent information may be further based on any other current data (e.g., pertaining to a predefined time period such up to 1 minute ago, up to 10 minutes ago, up to an hour ago), and historic data, and so on. For example, any of the types of data and the types of information discussed above with respect to method 500 and/or to method 600—as well as any combination of one or more of them—may be used in the generating of the set of possible deviation maneuvering schemes at step 640.

Referring to the aforementioned predefined suitability criterion, it is noted that different types of suitability criteria may be applied to different types of obtained data, e.g., depending on the kind of circumstance-dependent information obtained. For example, criteria which is relevant to safety information may include safety criteria and collision prevention criteria; criteria which is relevant to weather-related information may include meteorological criteria, operational impact criteria, and visibility and navigation criteria; criteria which is relevant to navigation hazard information may include obstacle clearance criteria, safe passage depth criteria, and dynamic risk criteria; criteria which is relevant to maritime traffic situation information may include congestion criteria, sufficient operational response time criteria, risk-based congestion mitigation criteria, and secure transit criteria; criteria which is relevant to port and infrastructure information may include infrastructure maintenance criteria, and efficient traffic flow criteria; criteria which is relevant to emergency situation information may include medical treatment duration criteria, mechanical repair criteria, and search and rescue criteria; criteria which is relevant to regulatory and political information may include jurisdictional compliance criteria, and compliance assurance criteria; criteria which is relevant to marine wildlife condition information may include conservation criteria, migration pattern criteria, and ecological impact criteria.

Method 600 includes step 650 of assessing consequences of different possible deviation maneuvering schemes out of the set of possible deviation maneuvering schemes. Step 650 may include various types of analysis, such as: safety analysis, timing analysis, regulation compliance analysis, Method 600 includes assessing consequences of different possible deviation maneuvering schemes out of the set of possible deviation maneuvering schemes, collectively referred to as step 650. The assessing of consequences of the different possible deviation maneuvering schemes may include various types of analysis, such as any one or more of the following: safety analysis, timing analysis, regulation compliance analysis, fuel consumption analysis, cost-benefit analysis, environmental impact analysis, operational feasibility analysis, resource allocation analysis, trajectory optimization analysis, energy efficiency analysis, failure mode and effects analysis, communication and coordination analysis, and human factors analysis. These analyses may involve evaluating the impact of the deviation maneuvering schemes on aspects such as any one or more of the following: vehicle stability, estimating the time required to execute the deviation under various conditions, ensuring adherence to applicable traffic or aerospace regulations, determining the financial implications of the deviation in terms of fuel or energy consumption, assessing the environmental effects such as emissions or noise, analyzing the practicality of implementing the maneuver based on current system or crew capabilities, optimizing resource utilization, identifying potential risks or hazards associated with the maneuver, improving trajectory for minimal disruption or resource use, maximizing energy efficiency under operational constraints, examining potential failure points and their impacts, ensuring clear communication and coordination with other system elements or external parties, and accounting for human interaction or response times in the maneuvering process.

Significantly, method 600 includes step 652 of performing fuel consumption analysis for the set of possible deviation maneuvering schemes to assess fuel consumption in different possible deviation maneuvering schemes. The fuel consumption analysis of step 652 may optionally be based on outputs of method 500, such as the historic acceleration analysis data, the excess acceleration data generated for the monitored marine vessel, and/or the excess acceleration data generated for other marine vessels (e.g., marine vessels of the same class, or other similar parameters). However, this is not necessarily so, and any suitable data (e.g., stored in any suitable database) may be used for the performing of the fuel consumption analysis (e.g., manufacturer data, crew estimates).

It should be noted that while steps 640 and 650 were described as two distinct steps of method 600, this is not necessarily so. Processes and computations involved with steps 640 and 650 may be executed in any manner and in any schedule of execution (e.g., orderly, concurrent, partly concurrent, or other suitable configurations). Processes and computations described in the context of step 650 may be executed before processes and computations associated with step 640, and even affect the execution of parts of step 640. For example, steps 640 and 650 may be executed in an intertwined manner to optimize performance, in an intermittent manner to account for external constraints, or in other flexible arrangements that meet operational requirements.

Method 600 continues with step 660 of computing a recommended deviation scheme for the marine vessel based on results of the fuel consumption analysis, to reduce fuel consumption of the marine vessel in maneuvering with respect to the other maritime object. Specifically, step 600 may include computing a real-time recommended deviation scheme for the marine vessel based on results of the fuel consumption analysis, to reduce fuel consumption of the marine vessel in maneuvering with respect to the other maritime object. That is, method 660 may include generating a real time recommendation in response to a developing real-time situation—e.g., unexpected or unforeseeable situation, such as a safety related situation—that evolved during the voyage of the marine vessel (and that requires a change of course, or at least the consideration of such a change), and make the real time recommendation of the suggested maneuvering of the marine vessel not only safe but also fuel efficient. The recommended deviation scheme may be an explicit deviation scheme selected at step 660 out of a plurality of considered deviation scheme, or be otherwise devised based on the analysis of the set of possible deviation maneuvering schemes, or be otherwise computed based on the analysis of that set. For example, the recommended deviation scheme may be computed at step 660 by determining parametric values for a parametrically defined group of possible deviation maneuvering schemes that was analyzed at step 650.

The computation of the recommended deviation scheme may optionally be based on outputs of method 500, such as the historic acceleration analysis data, the excess acceleration data generated for the monitored marine vessel, and/or the excess acceleration data generated for other marine vessels (e.g., marine vessels of the same class, or other similar parameters). However, this is not necessarily so, and any suitable data (e.g., stored in any suitable database) may be used for the performing of the fuel consumption analysis (e.g., manufacturer data, crew estimates).

FIG. 8 illustrates several optional steps of method 600, in accordance with examples of the presently disclosed subject matter. Method 600 may optionally continue with executing any one or more of steps 670, 680, 690, and 6100, and/or any other follow-on action based on the computation of the recommended deviation scheme.

Optional step 670 includes controlling navigation of the marine vessel based on recommended deviation scheme. For example, the controlling of the navigation of step 670 may include: adjusting relevant operational parameters in a controlled and systematic manner, coordinating with automated systems or human operators to implement the changes, verifying that the recommendation aligns with predefined constraints or operational goals, ensuring safety and compliance. Referring to the example set forth with respect to the previous drawings, optional step 670 may be executed by processor 220 and/or ship systems control module 260. Step 670 may include executing any functionality or capability discussed above with respect to ship systems control module 260 based on the recommended maneuvering scheme. For example, step 670 main include controlling and regulating operations of one or more key ship systems, such as: propulsion systems (e.g., main and auxiliary engines), steering systems (e.g., rudders and stabilizers), navigation aids, power distribution, ballast water management systems, cooling systems, and cargo handling machinery.

For example, method 600 may include (e.g., as part of optional step 670) triggering a deviation of the marine vessel based on the recommended deviation scheme, the deviation including any one or more of the following:

a. modifying of direction of the marine vessel by at least 2° over less than 30 minutes.
b. Reducing a velocity of the marine vessel by at least 10%, by at least 20%, by at least 3 knots (3 kn) over than less than 30 minutes.

Optional step 680 includes providing the recommended maneuvering scheme to crew of the marine vessel in real time. This step focuses on conveying the computed recommendation(s) to the relevant crew or operational personnel in an accessible and timely manner. Key considerations include delivering information through UI/UX interfaces, such as visual displays, audio alerts, or haptic feedback. Optional step 680 may also include providing supplementary details, such as the rationale for the recommendation, predicted outcomes, and any relevant constraints. Optional step 680 may also include ensuring the recommendation is presented in real-time to facilitate immediate decision-making and response. It is noted that method 600 may include presenting to the one or more crew members of the marine vessel (and/or to decision makers outside the marine vessel) more than one recommendation. For example, if during the computations of step 660 it is determined that two or more deviation schemes are reasonable, two or more recommended deviation schemes may be presented. For example, the two or more recommended deviation schemes may all have sufficient fuel consumption efficiency and all meet the predetermined suitability criteria of step 640, but they differ in other important aspects which the crew may have preference over (e.g., minimal distance from shore, average distance from shore, likelihood of encountering marine life). Optionally, customizable notification preferences may be implemented, allowing customization of how the crew receive notifications, e.g., based on priority levels or operational needs.

Optional step 680 may be followed up by optional step 690 that includes monitoring and recording crew response (e.g., tracking whether or not action was taken in response to the recommendation). The monitoring process may involve, by way of example: logging actions taken in response to the recommendation, including timing and extent of execution, identifying instances where no action was taken, along with potential reasons (e.g., conflicting priorities, manual overrides), using sensor data, system logs, or manual input to document compliance or deviations.

Optional step 6100 includes utilizing any output of method 600 (including any of its steps) in future fuel consumption management analysis (e.g., in future iterations of method 600 for the same marine vehicle and/or for other marine vehicles, as input for method 500, and so on). For example, step 6100 may include integrating the tracked data into subsequent analyses to enhance future recommendations regarding fuel consumption efficiency and efficient fuel consumption oriented navigation. Such future analysis may include, for example, aggregating and analyzing historical data on recommendation outcomes, actions taken, and system performance, identifying patterns or trends that could improve the accuracy and relevance of future recommendations, incorporating insights into the design of algorithms, decision-making protocols, and training programs for crew or operators, and so on.

By implementing any one or more of steps 670, 680, 690, and 6100, method 600 may implement a dynamic and adaptive process that continuously refines operational performance based on real-time actions and historical insights.

Another step which may follow step 660 is obtaining crew-provided feedback and utilizing the crew-provided feedback for training of machine learning systems that implement method 600.

Reverting to the circumstance-dependent information obtained at step 630 (e.g., based on real-time processing in optional step 610, such as onboard real-time processing), it is noted that specialized computer systems (e.g., like system 200, and especially processor 220) may be able to identify information indicative that the likelihood that a route deviation will be required for the marine vessel much before human crew is able to identify such situations, and at least much before human crew is accustomed to response to such situations—especially slowly and gradually unfolding situations. For example, such a specialized computer system may identify that another marine vessel 320 might cross too close to the marine vessel 100 an hour in advance.

By executing method 600, such a specialized computer system may determine that a relatively small changing of the course of the marine vessel 100 at this early stage may have little effect on the overall duration of the sailing, but could save a lot of fuel usage for slowing down the marine vessel and later accelerating it again to nominal sailing velocity, in case close crossing with the respective other marine vessel 320 will occur. While safety of both marine vessel is paramount and justify the rapid slowing down and then accelerating of the marine vessel to comply with minimal safety distance between the two marine vessels, method 600 can be executed to maintain the safety aspects manifested in the minimal safety distance (or other safety regulations and requirements), while preemptively planning and evaluating alternative possible deviation maneuvering schemes, for generating an optimized deviation schemes which optimizes fuel consumption while meeting safety requirements and possibly additional requirements (e.g., time to destination port, etc.). As discussed above, method 600 may also be used to react to other types of event, which may or may not have security aspect associated with which. Method 600 may be used as a way to promote various aspects which may be important to the operation of the marine vessel, to its clients, and so on—while using preemptive analysis to ascertain that such causes are promoted in a way which optimizes fuel consumption while meeting criteria that promote such wide variety of causes.

Optionally, in cases the circumstance-dependent information is indicative of a higher likelihood that a route deviation from the present route of the marine vessel will be required due to an increased likelihood for collision with another maritime object, method 600 may include generating of the recommended deviation scheme (in step 660) for the marine vessel substantially before a time of nearest distance between the marine vessel and that other maritime object. The time of nearest distance is the point in time in which the distance between the marine vessel and the other maritime object (e.g., another marine vessel 320, an iceberg, a rig) is the smallest during the voyage of the marine vessel.

In some scenarios—such as travel in oceanic or other open sea conditions—method 600 may include generating the recommended deviation scheme (in step 660) for the marine vessel at least an hour, at least two hours, or even at least four hours before a time of nearest distance between the marine vessel and the other maritime object. In other scenarios—such as coastal navigation, port adjacent navigation, congestion hotspots, etc.—things change faster, and fuel consumption oriented recommendation by method 600 may nevertheless be provided, but with shorter head notice. For example, in some such scenarios, method 600 may include generating the recommended deviation scheme (in step 660) for the marine vessel at least 10 minutes, 20 minutes, 30 minutes, or even at least an hour before a time of nearest distance between the marine vessel and the other maritime object.

While not necessarily so, any one or more of the steps of method 600—and possibly all of them—are executed onboard the marine vessel whose maneuvering is being analyzed. For example, optionally the steps of processing (630), generating (640), performing (650) and computing (660) are executed onboard the marine vessel further in response to sensor data obtained from sensors installed on the marine vessel.

Optionally, method 600 may be implement in a way which favors fuel efficiency of the recommended deviation scheme over attempts to minimize the length of the deviation. While some longer optional deviation routes may take longer to sail and may consume more fuel, method 600 may capitalize on cases in which the optional deviation schemes with shorter routes are in fact less fuel efficient, especially in cases in which significant accelerations are required (either slowing down or increasing the speed of the marine vessel)—actions which are inefficient in the fuel consumption. Additional discussion on these aspects was provided above with respect to method 500 and 600.

Optionally, the computing of the recommended deviation scheme at step 660 includes computing the recommended deviation scheme at least partly based on the recommended deviation scheme having a smaller fuel consumption estimate in the fuel consumption analysis than any analyzed possible deviation maneuvering scheme with shorter estimated overall maneuvering duration. That is, while several possible deviation maneuvering scheme (out of the analyzed set of potential deviation maneuvering schemes) may have deviation schemes which offer to meet the predetermined suitability criterion (e.g., the collision prevention safety criterion) in overall shorter deviation sailing time (until returning to course, and/or with respect to the estimated sailing time prior to the deviation) with respect to the recommended deviation scheme, step 600 may include preferring the recommended deviation scheme over these more time-efficient alternatives, in order to save fuel. It is nevertheless noted that this is not always the case, and optionally in some cases, other considerations make take priority over fuel consumption (e.g., reaching the destination port before a predetermined time, or reducing sailing time in the national waters of specific countries).

It is noted that the most prominent key performance index (KPI) for mid-voyage onboard decisions in significant portions of the shipping industry—especially pertaining to the selection between alternatives routes, e.g., in the container shipping, oil and gas tanker, automotive shipping (“Ro-Ro”) industries—is meeting the Estimated Time of Arrival (ETA):

arrive at the designated ETA without delays. Method 600, in comparison, may be implemented for introducing "fuel consumption awareness" to mid-voyage onboard decision making.

Optionally, method 600 may yield a recommendation to slow down the marine vessel or to divert its course to a longer route (e.g., preemptively assessing a non-negligible likelihood of event in which a more drastic acceleration event might be needed in the foreseeable future if no preemptive course change will be undertaken) in order to make the voyage more efficient (e.g., saving overall fuel consumption).

Optionally, the computing of the recommended deviation scheme includes computing the recommended deviation scheme at step 660 may be at least partly based on determining that the recommended deviation scheme has a smaller fuel consumption estimate (in the fuel consumption analysis) than an alternative analyzed possible deviation maneuvering scheme with an estimated overall maneuvering duration shorter by at least 10% than an estimated overall maneuvering duration of the recommended deviation scheme. Optionally, the computing of the recommended deviation scheme includes computing the recommended deviation scheme at step 660 may be at least partly based on determining that the recommended deviation scheme has a smaller fuel consumption estimate (in the fuel consumption analysis) than an alternative analyzed possible deviation maneuvering scheme with an estimated overall maneuvering duration shorter by at least 10 minutes, at least 20 minutes, at least 30 minutes, and even at least 1 hour than an estimated overall maneuvering duration of the recommended deviation scheme. Optionally, method 600 may generate a recommended deviation scheme whose implementation adds a significant time to the overall voyage duration compared to other analyzed options, in order to save fuel—and with it to reduce operation costs.

Optionally, the estimated overall maneuvering duration of a deviation maneuvering scheme is defined as the time by which the marine vessel returns to its planned route. Optionally, the estimated overall maneuvering duration of a deviation maneuvering scheme is defined as the estimated time that implementing the scheme would add to the overall voyage duration of the marine vessel. The latter definition may be implemented explicitly, or in a relative fashion (e.g., deviation maneuvering scheme A would add 8 more minutes to the overall voyage compared to deviation maneuvering scheme B).

Optionally, the computing of the recommended deviation scheme (in step 660) may include computing the recommended deviation scheme to minimize speed reduction (deceleration) of the marine vessel during the deviation maneuver. Recovering lost speed requires using a relatively large amount lot of fuel, and the fuel consumption analysis performed at step 652 may inform computing a recommended deviation scheme which minimizes speed reduction in the deviation maneuver. For example, the computing of the recommended deviation scheme may include computing the recommended deviation scheme in which an expected speed reduction (deceleration) of the marine vessel is smaller than expected decelerations of any other at least one analyzed possible deviation maneuvering scheme having an estimated overall maneuvering duration shorter by up to 10% (and/or by up to 10, 20 minutes, etc.) than an estimated overall maneuvering duration of the recommended deviation scheme.

Optionally, the computing of the recommended deviation scheme (in step 660) may include rejecting at least one other analyzed possible deviation maneuvering scheme having an expected deviation route that is more than 10% shorter than an expected deviation route of the recommended deviation scheme—at least partly based on the at least one other analyzed possible maneuvering scheme having a fuel consumption estimate in the fuel consumption analysis larger by at least 5% than a fuel consumption estimate of the recommended deviation scheme in the fuel consumption analysis. Optionally, method 600 may generate a recommended deviation scheme whose implementation adds a significant voyage distance to the overall voyage duration compared to other analyzed options, in order to save fuel—and with it to reduce operation costs.

Optionally, the length of an analyzed deviation route and/or deviation maneuvering scheme is defined as the distance the marine vessel has to travel until it returns to its planned route. Optionally, the length of an analyzed deviation route and/or deviation maneuvering scheme is defined as the estimated distance that implementing the respective route or scheme would add to the overall voyage distance of the marine vessel. The latter definition may be implemented explicitly, or in a relative fashion (e.g., deviation maneuvering scheme A would add 8 more nautical miles to the overall voyage compared to deviation maneuvering scheme B). Optionally, the fuel consumption estimate of a deviation maneuvering scheme is defined as the amount of fuel that will be required by the marine vessel until it returns to its planned route. Optionally, the fuel consumption estimate of a deviation maneuvering scheme is defined as the amount of additional fuel consumption that implementing the scheme would add to the overall voyage duration of the marine vessel. The latter definition may be implemented explicitly, or in a relative fashion.

Referring to method 600 as a whole, it is noted that method 600 may be implemented as a reiterative, recurring, and/or ongoing process. For example, method 600 may be continuously implemented during a voyage of the marine vessel, evaluating possible course changes (or other deviation maneuvering schemes) along the course of the voyage. For example, Method 600 may include reiterating at least thrice the steps of: processing current navigational data to generate a new set of possible deviation maneuvering schemes for the marine vessel; performing fuel consumption analysis for the new set of possible deviation maneuvering schemes and computing a new recommended deviation scheme for the marine vessel different than the recommended deviation scheme of the previous iteration to reduce fuel consumption of the marine vessel in maneuvering with respect to the other maritime object. The number or reiteration may, of course, be much larger—in the hundreds, thousands, tens of thousands, or more. However, method 600 may also include reiterating any one or more of its steps pertaining to a single unfolding event.

For example, identification that an approaching marine vessel 320 exceeded a proximity threshold may trigger one iteration of method 600 and yield a recommended deviation scheme; however, that other marine vessel 320 may change its own course (or even stay its course and not navigating in a possibly interfering way), in which case a new deviation scheme may be computed, and so on. The same is of course true for other types of events, such as these discussed above.

Furthermore, later steps of method 600 (especially steps 640, 650, 660, and the optional following steps) may optionally be triggered without a specific circumstance-dependent information that indicates a higher likelihood that a route deviation from the present route of the marine vessel will be required. For example, system 200 may implement a method in which every iteration of its one or more iteration starts with processing current navigational data of the marine vessel to generate a set of possible deviation maneuvering schemes for the marine vessel which qualify a predetermined suitability criterion (an equivalent of step 640, but not being based on any specific circumstance-dependent information). For example, each such iteration may be triggered periodically (e.g., every 10 minutes, every hour), upon a request from the crew, as a result of distance traveled from a previous iteration (e.g., every 1 NM, every 10 NM, every 50 NM), and so on. Such an implementation may be applied to an autonomous navigation marine vessel or to any marine vehicle recommendation system, as reducing fuel consumption may also occur without special circumstances being explicitly identified.

It should also be noted that while most of the examples given above regarding motivation for route changes were of unforeseen trouble or potential of complication, unplanned surprises may also be of opportunities. For example, the circumstance-dependent information may indicate that an area of the sea is presently experiencing a significantly lower-than-usual traffic, and such an opportunity could be used for changing route—and for reducing fuel consumption (e.g., not requiring the usual detour around that area). In another example, swath of the ocean which is usually dangerous to sail through during winter is found to be clear of ice, and can be utilized. Such opportunities may be identified as part of step 630, but may also be used in systems which operates routinely, like the ones discussed in the previous paragraph.

Figure 10A:
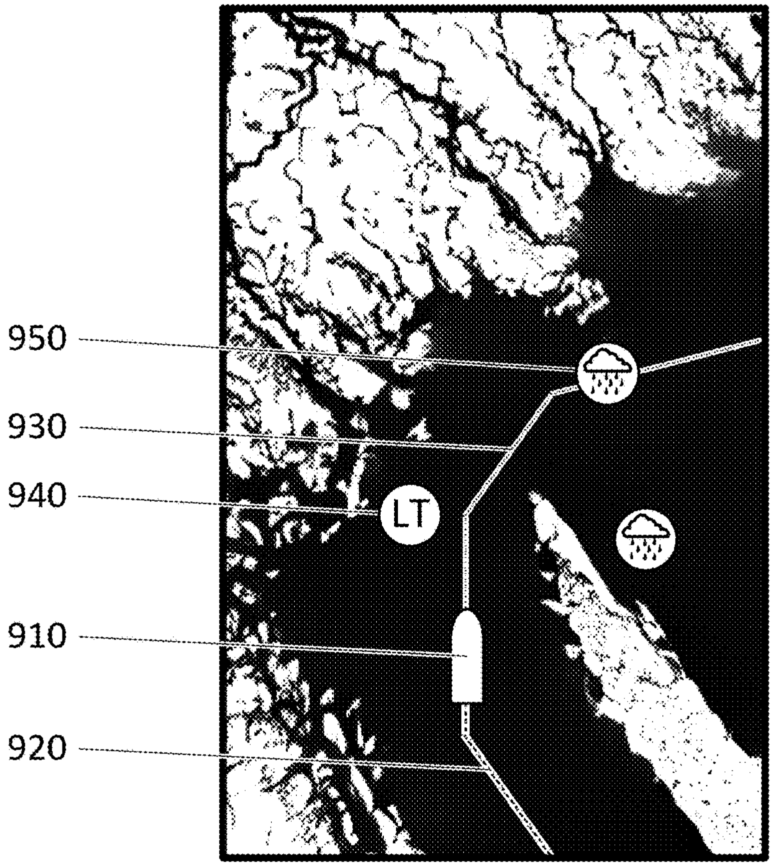
FIGS. 10A and 10B are schematic representations of a user interface of a recommendation navigation system operable to issue fuel consumption improving deviation maneuvering scheme recommendations.
Figure 10B:
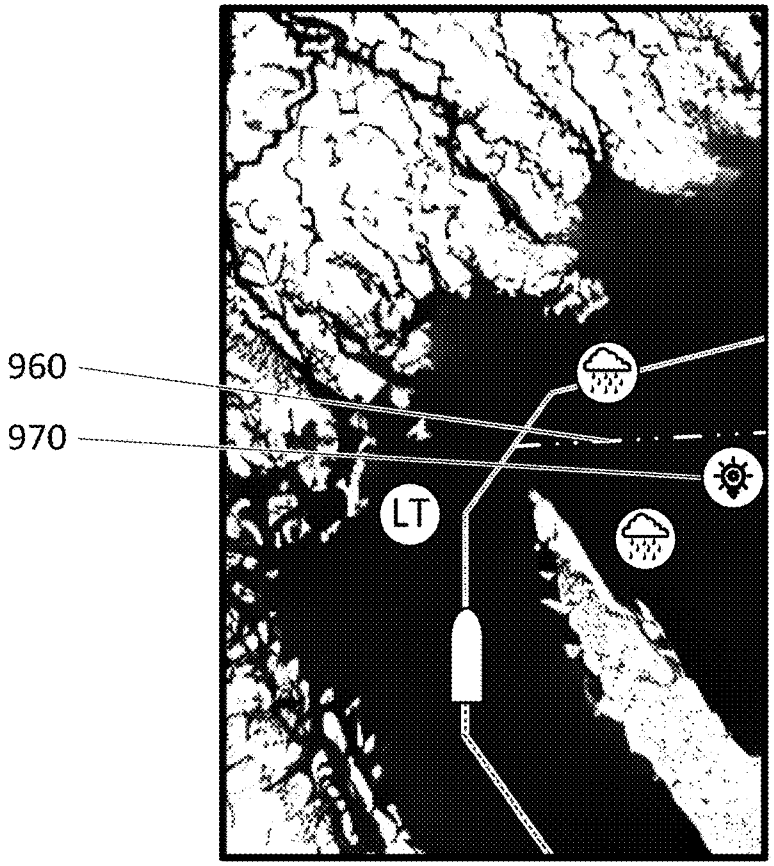

FIGS. 10A and 10B are schematic representations of a user interface of a recommendation navigation system operable to issue fuel consumption improving deviation maneuvering scheme recommendations, in accordance with examples of the presently disclosed subject matter. The illustrated user interface may be displayed on a computer monitor, on screen of an onboard system, in an overhead projection display, and so on. In addition to a map of a vicinity of the respective marine vessel (e.g., marine vessel), the user interface (UI) includes overlayed layers of information, such as any one or more of the following:

a. Representation 910 of a position of the marine vessel (e.g., a ship icon, not to scale with the map).
b. A representation of the course of the marine vessel leading to the present position (denoted 920).
c. A representation of the presently planned course of the marine vessel from the present position (denoted 930).
d. Real-time navigation information such as areas of high, low, higher-than-usual, lower-than-usual traffic (LT, denoted 940), areas of bad weather (such as storm icons 950), indication of national waters or other regulatory areas (not shown), and so on.

As can be seen in the example of FIG. 10A, the presently planned course of the marine vessel intersects an area of bad weather, which may trigger an issuance of a weather-related information (e.g., at step 632) indicative of hazardous weather. Following an execution of method 600, the respective UI system may present to the user recommended deviation route 960, and optionally also UI interface 970, inviting a user of the system (e.g., crewmember, supervisor) to examine other alternatives for highly ranked possible deviation maneuvering routes/schemes.

It is noted that method 600 may be implemented to generate proposed deviation schemes for many marine vessels of a fleet over many voyages. This may allow comparison of different marine vessels (e.g., the frequency and/or degree of required deviations from route, comparison of different crews (or specific crew members), comparison of performance of the same marine vessel over time (e.g., as a metric for triggering an alert that something may be wrong). Likewise, generation of proposed deviation schemes for multiple marine vessels of a fleet can also be used to provide statistics or other aggregative data for the entire fleet (or categorized parts of the fleet).

Figure 11:
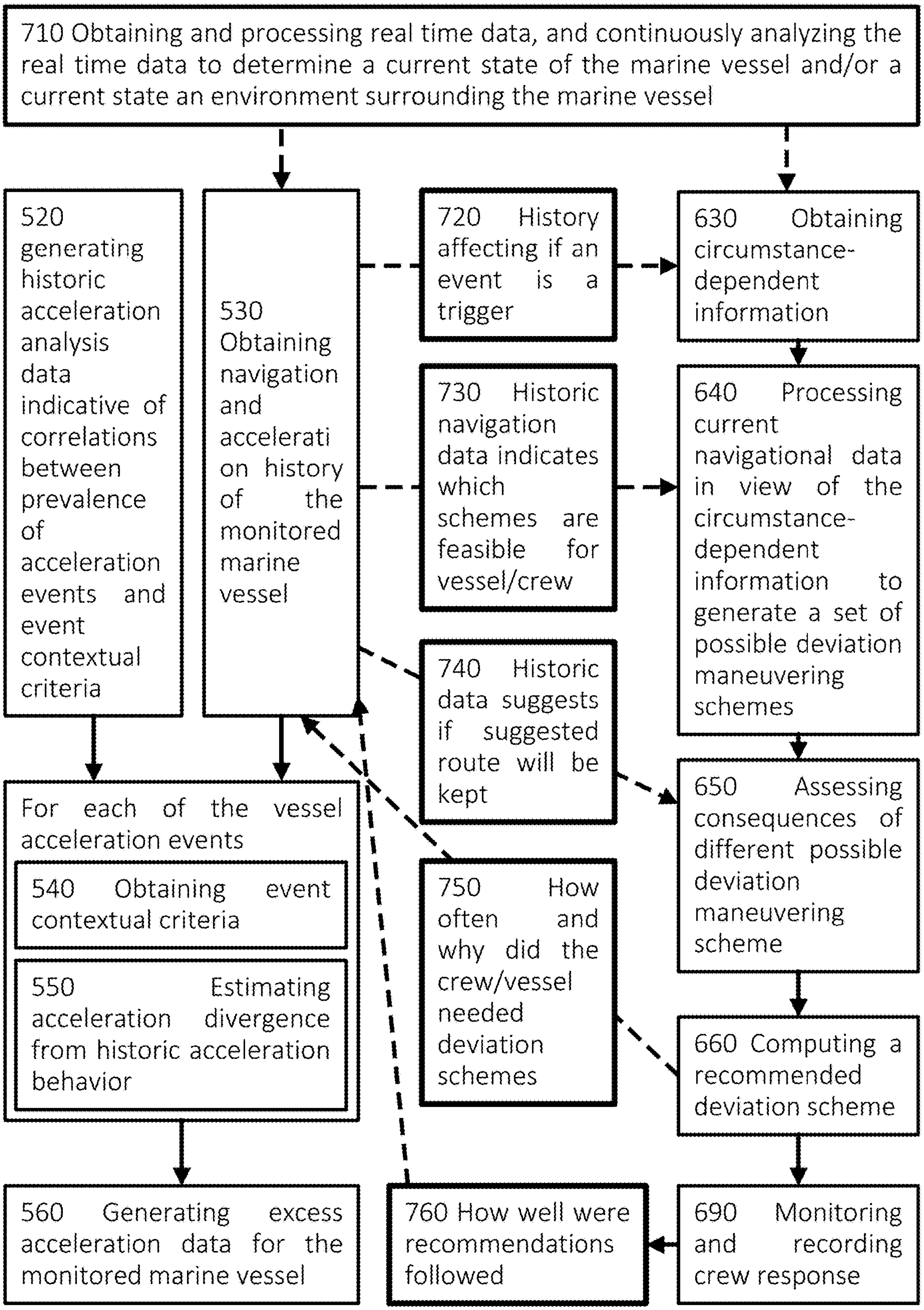
FIG. 11 is a flow chart illustrating some of the possible interoperability of the aforementioned computer-implemented methods for fuel consumption management of marine vessels and for improving fuel consumption of a marine vessel.

FIG. 11 is a flow chart illustrating some of the possible interoperability of methods 500 and 600, in accordance with the presently disclosed subject matter. As aforementioned, system 200 may be configured and operable to execute method 500, method 600, or both methods. While both methods 500 and 600 may be implemented and executed independently of one another, implementing both in a synergetic manner may provide more detailed, nuanced, or accurate results, for example. It is noted that each of steps 710, 720, 730, 740, 750, and 760 may be implemented independently of the other steps of this list, but may also be implemented together with any one or more of the other steps of the list, possibly in a synergetic manner. It is further noted that there are many other ways in which results of one or more steps of method 500 may be fed as inputs to one or more steps of method 600, and vice versa, several nonlimiting examples of which were offered above.

Step 710 of FIG. 11 includes obtaining and processing real time data, and continuously analyzing the real time data to determine a current state of the marine vessel and/or a current state an environment surrounding the marine vessel. The processing of step 710 may be implemented using machine learning algorithm, generative AI algorithms, heuristic algorithms, as well as any other suitable type of software, firmware, and/or hardware. Examples of types of real time data which may be obtained and analyzed were provided above, e.g., with respect to system 200, method 500, and method 600. Such processed data may be provided as input to steps 530 and/or 630, for example.

Step 720 shows how historic acceleration data which is associated with the respective marine vessel and/or the operating crew of that vessel may assist in determining whether a specific event (e.g., arising from the real time data of step 710) constituents a trigger for step 630. For example, a certain approaching marine vessel may not require assessment of alternative routes for a monitored marine vessel which can turn quickly or for a crew that is historically alert, but may result in issuing of safety information alert for other marine vessels or operating crews. Similarly, the excess acceleration data generated at step 560 may also be used to determine whether a specific event constituents a trigger for step 630.

Step 730 shows that historic navigation data obtained at step 530 (as well excess acceleration data generated at step 560, not shown in FIG. 11) may be used at step 640 as a source data for determining which deviation schemes are at all feasible and/or reasonable for a specific marine vessel and/or crew.

Step 740 shows that historic navigation data obtained at step 530 (as well excess acceleration data generated at step 560, not shown in FIG. 11) may be used at step 650 as a source data for determining how likely the marine vessel and/or its crew are to maintain the proposed deviation maneuvering scheme, which may affect the assessment of the different possible deviation maneuvering scheme.

Steps 750 and 760 demonstrate how outputs of method 600 may optionally be used as inputs for steps of method 500. For example, details of the recommended deviation scheme computed at step 660 (and possibly additional data pertaining to the scheme, other schemes, or the event leading to its devising) may be used as part of the historic data pertaining to the monitored marine vessel at step 530. For example, such data may be used to determine historic records of how often the respective marine vessel and/or crew encountered a situation in which alternative deviation schemes were required, the degree of the deviation required, and the reasons for it.

Step 760 shows how outputs of optional step 690 may be collected in step 530, and later used at following steps of method 500 to assess responsiveness patterns of the crew to advanced warnings, to suggested deviations and to fuel saving alternatives, and based on these pattern to assess the excess acceleration data for the monitored marine vessel (or to the crew).

Referring to method 500, to method 600, and to the potential synergetic implementation of methods 500 and 600, it is noted that many factors can affect both the fuel consumption analysis and/or acceleration statistical analysis of method 500, and the early deviation schemes of method 600. Information collected—in real time or not—pertaining to these different aspects of the marine vessel and its voyage may benefit both methods, albeit in possibly different ways.

For example, location-associated data (e.g., geospatial databases or geographic information system (GIS) databases) may be used at method 500 to provide safety distance requirements associated with different parts of the route of the marine vessel, as well as statistical frequency of surprise events encountered by various ship in each geographic location. In the context of method 600 location-associated data may be used to identify hotspots like "choke points", "especially congested ports" or "especially congested routes" which can be a combination of location and seasonality, and that may affect the proposed recommendation.

For example, crew-associated data (having granularity pertaining to a single crewmember or to larger groups of people) may be used at method 500 to react to the fact that some crews conduct more route alterations than other, for creating a profile for specific crew's fuel consumption and then comparing that profile to a benchmark determined by statistics including additional crews. In the context of method 600, crew-associated data may be used to score each crew (or crew member) on various scales (e.g., to what degree the crew is safety-oriented, to what degree the crew is efficient, and to what degree the crew is a fast sailing crew). Determining of what constitutes a triggering event, and how the different alternative deviation schemes should be assessed.

For example, weather-related data may be used at method 500 to evaluate various acceleration events; at method 600 weather-related data may be used for determining which possible deviation maneuvering schemes could benefit from the real time and/or the forecasted currents and winds (e.g., allowing to reduce RPM of the engine while maintaining the same speed. Weather-related data may also be used in method 600 for assessing the expected wellbeing of the crew, and expected ship lashing and/or the expected required preparations of the marine vessel associated with the different possible deviation maneuvering schemes.

Referring to method 500, to method 600, and to the potential synergetic implementation of methods 500 and 600, it is noted that any of these processes may be executed in ways which implement any one or more of the following aspects in a way which improves the outputs of the respective system, their granularity, effectiveness, cost-effectiveness, and so on:

a. Combine historical data with real-time data collecting during the voyage of the respective marine vessel. For example, combining information pertaining to past trends (e.g., of the respective marine vessel, of similar marine vessels, of the entire fleet) with real time live sensor data for predictive modeling.
b. Conducting statistical analysis of the various types of information collected during and/or generated by execution of the respective methods to determine benchmarks for operation of marine vessels according various aspects and KPIs. This also allow to identify suboptimal behaviors of certain marine vessels and/or certain crews—either consistently or in different times, locations, etc.
c. Such analysis may also be used to identify specific types of crew decisions which are recurrently inefficient, for targeted feedback.
d. Collecting data regarding the way data generated in either of the methods was put to effective use and reacted upon, or ignored (e.g., implementing a suitable analytics layer).
e. Crew-specific Insights and/or analysis may be implemented, e.g., for providing personalized recommendations (regarding routes, acceleration, awareness for certain aspects of ship operations, etc.), adapting navigation strategies based on crew performance history, leveraging reinforcement learning, dynamically improving models using feedback from real-world outcomes, and so on.
f. Iterative refinement of the methods (e.g., refinements and fine-tuning of parameter values used in the assessment and/or other computation process of the respective methods). This may include, for example, adjusting recommendations based on feedback from navigation outcomes, adapting to new data and new conditions, refine strategies for future scenarios, and so on.

Reverting to the discussion of system 200 and of processor 220. As aforementioned, system 200 and its different components may optionally be configured to execute method 500, method 600, and/or both methods 500 and 600.

Referring by way of example to method 500, it is noted that optionally system 200 may be a system for fuel consumption management of marine vessels (or—a system with fuel consumption management capabilities pertaining to marine vessels). Optionally, memory module 210 may including suitable computer program code (also referred to as "first computer program code"), such that memory module 210 and the first computer program code are configured, with processor 220, to cause the system to at least:

a. Obtain historic navigation data of a plurality of marine vessels, indicative of routes and accelerations in past voyages of each marine vessel out of the plurality of the marine vessels (variations of this capability may correspond to step 510 and to its possible variations; for example, this capability—as well as execution of step 510—may be facilitated by historic data processing module 222 of processor 220);
b. Process the historic navigation data to generate historic acceleration analysis data indicative of correlations between prevalence of acceleration events and event contextual criteria, the event contextual criteria comprising at least acceleration event location (variations of this capability may correspond to step 520 and to its possible variations; for example, this capability—as well as execution of step 520—may be facilitated by historic data processing module 222 of processor 220);
c. Obtain navigation data of a monitored marine vessel, indicative of a plurality of vessel acceleration events of the monitored marine vessel, the plurality of vessel acceleration events comprising at least a first vessel acceleration event and a second vessel acceleration event (variations of this capability may correspond to step 530 and to its possible variations; for example, this capability—as well as execution of step 530—may be facilitated by historic data processing module 222 of processor 220);

d. For each vessel acceleration event out of the plurality of vessel acceleration events: (a) obtain event contextual criteria of the respective vessel acceleration event; and (b) estimate acceleration divergence from historic acceleration behavior based on the event contextual criteria and on the historic acceleration analysis data (variations of this capability may correspond to steps 540 and 550, respectively, and to their possible variations; for example, this capability—as well as execution of steps 540 and 550—may be facilitated by contextual event analysis module 223 of processor 220); and to e. Generate excess acceleration data for the monitored marine vessel based on the plurality of acceleration divergences estimated for the marine vessel, the excess acceleration data indicative of degree of excess acceleration of the monitored marine vessel at the plurality of vessel acceleration events (variations of this capability may correspond to step 560 and to its possible variations; for example, this capability—as well as execution of step 530—may be facilitated by fuel consumption analysis module 224 of processor 220 and/or by maneuvering analysis module 225 of processor 250).

Optionally, the excess acceleration data may be indicative of estimated excess fuel usage by the monitored marine vessel.

Optionally, the first vessel acceleration event includes deceleration of the monitored marine vessel at a first deceleration degree, the second vessel acceleration event includes deceleration of the monitored marine vessel at a second deceleration degree that is a greater deceleration degree than the first deceleration degree, the first vessel acceleration event occurs at a first location corresponding to first location criteria and the second vessel acceleration event occurs at a second location corresponding to second location criteria differing than the first location criteria. In such case, the at least one memory and the first computer program code may be further configured, with the at least one processor, to cause the system to: (a) estimate substantial divergence from historic acceleration behavior for the first vessel acceleration event based on the first location criteria; and (b) estimate insubstantial divergence from historic acceleration behavior for the second vessel acceleration event based on the second location criteria. These estimations may be facilitated, for example, by fuel consumption analysis module 224 and/or by maneuvering analysis module 225.

Optionally, the first location criteria is indicative of the first vessel acceleration event occurring at open seas, with the second location criteria being indicative of the second vessel acceleration event occurring within 12 nautical miles from a seaport (or any other suitable value, e.g., as discussed above with respect to method 500). Optionally, the first location criteria is indicative of the first vessel acceleration event occurring at open seas, and the second location criteria is indicative of the second vessel acceleration event meeting a predetermined seaport proximity criteria indicative of a degree of proximity of the first vessel acceleration event to a seaport.

Optionally, memory module 210 and the first computer program code may be configured, with processor 220 to cause system 200 to: (a) obtain for at least one vessel acceleration event out of the plurality of vessel acceleration events the contextual criteria that is further indicative of congestion in a vicinity of the monitored marine vessel during the respective vessel acceleration event (possibly facilitated by real time data analysis module 221 of processor 200); and (b) to estimate the acceleration divergence further in response to the congestion (these estimations may be facilitated, for example, by fuel consumption analysis module 224 and/or by maneuvering analysis module 225).

Optionally, the first vessel acceleration event may include deceleration of the monitored marine vessel at a first deceleration degree, the second vessel acceleration event includes deceleration of the monitored marine vessel at a second deceleration degree that is a greater deceleration degree than the first deceleration degree. In such case, memory module 210 and the first computer program code may optionally be configured, with processor 210, to cause system 200 to estimate substantial divergence from historic acceleration behavior for the first vessel acceleration event and estimating insubstantial divergence from historic acceleration behavior for the second vessel acceleration event, based on the second vessel acceleration event occurring at a less congested sea scenario than the first vessel acceleration event. These estimations may be facilitated, for example, by fuel consumption analysis module 224 and/or by maneuvering analysis module 225.

Optionally, the obtained historic navigation data is further indicative of environmental statuses in different parts of the past voyages of the respective marine vessels determined based on environmental sensor data collected by at least one external environment monitoring sensor onboard the respective marine vessel. In such cases, memory module 210 and the first computer program code may be configured, with processor 220 to cause system 200 to: generate the historic acceleration analysis data that is further indicative of correlation between prevalence of acceleration events and event contextual criteria including sensor based environmental statuses. The generation of the historic analysis data may be facilitated, for example, by fuel consumption analysis module 224 and/or by maneuvering analysis module 225.

Optionally, memory module 210 and the first computer program code are configured, with processor 220 to cause system 200 to: (a) obtain for at least one vessel acceleration event out of the plurality of vessel acceleration events the contextual criteria that is further indicative of a safety event status of the monitored marine vessel during the respective vessel acceleration event; and (b) to estimate the acceleration divergence further in response to the safety event status.

Optionally, memory module 210 and the first computer program code may be configured, with processor 220 to cause system 200 to: (a) estimate for the at least one vessel acceleration event optional divergence scenarios for the monitored marine vessel in view of at least the safety event status, and (b) assessing for the monitored marine vessel at least one of: (i) the acceleration divergence and (ii) excess fuel consumption, for the respective vessel acceleration event based on analysis of the optional divergence scenarios. These estimations may be facilitated, for example, by fuel consumption analysis module 224 and/or by maneuvering analysis module 225.

Optionally, memory module 210 and the first computer program code may be configured, with processor 220 to cause system 200 to generate a recommendation for navigation of the monitored marine vessel based on the excess acceleration data. This recommendation may be facilitated, for example, by maneuvering analysis module 225.

Optionally, the generation of the recommendation by system 200 is further based on location of the monitored marine vessel within up to an hour prior to the generating of the recommendation.

Optionally, the generation of the recommendation by system 200 is further based on environmental sensor data collected by at least one external environment monitoring sensor 250 onboard the marine vessel 100 within up to an hour prior to the generating of the recommendation.

Optionally, the generation of the recommendation by system 200 is further based on safety event status of the monitored marine vessel within up to an hour prior to the generating of the recommendation.

Referring by way of example to method 600, it is noted that optionally system 200 may be a system for improving fuel consumption of a marine vessel (or—a system with fuel consumption improvement capabilities pertaining to marine vessels). Optionally, memory module 210 may including suitable computer program code (also referred to as "second computer program code"), such that memory module 210 and the first computer program code are configured, with processor 220, to cause the system to at least:

a. Obtain safety information indicative of an increased likelihood for collision of the marine vessel with another maritime object (variations of this capability may correspond to step 630 and to its possible variations; for example, this capability—as well as execution of step 630—may be facilitated by real time data analysis module 221 of processor 220);
b. Process current navigational data of the marine vessel—data that is indicative of expected progression of the marine vessel—in view of the safety information, to generate a set of possible deviation maneuvering schemes for the marine vessel with respect to the other maritime object which qualify a collision prevention safety criterion (variations of this capability may correspond to step 640 and to its possible variations; for example, this capability—as well as execution of step 640—may be facilitated by maneuvering analysis module 225);
c. Perform fuel consumption analysis for the set of possible deviation maneuvering schemes to assess fuel consumption in different possible deviation maneuvering schemes (variations of this capability may correspond to step 650 and to its possible variations; for example, this capability—as well as execution of step 650—may be facilitated by fuel consumption analysis module 224 and/or by maneuvering analysis module 225); and
d. Compute a recommended deviation scheme for the marine vessel based on results of the fuel consumption analysis, to reduce fuel consumption of the marine vessel in maneuvering with respect to the other maritime object (variations of this capability may correspond to step 660 and to its possible variations; for example, this capability—as well as execution of step 660—may be facilitated by fuel consumption analysis module 224 and/or by maneuvering analysis module 225).

Optionally, processor 220 and memory module 210 may be located onboard marine vessel 100, in which cases system 200 may optionally further include sensors 250 onboard marine vessel 100 for collecting providing to processor 220 sensor data for generation by the processor of the recommended deviation scheme.

Optionally, memory module 210 and the second computer program code may be configured with processor 220 to cause system 220 to compute the recommended deviation scheme at least partly based on the recommended deviation scheme having a smaller fuel consumption estimate in the fuel consumption analysis than any analyzed possible deviation maneuvering scheme with shorter estimated overall maneuvering duration. This computation may be facilitated, for example, by maneuvering analysis module 225.

Optionally, memory module 210 and the second computer program code may be configured with processor 220 to cause system 220 to compute the recommended deviation scheme at least partly based on the recommended deviation scheme having a smaller fuel consumption estimate in the fuel consumption analysis than an alternative analyzed possible deviation maneuvering scheme with an estimated overall maneuvering duration shorter by at least 10% than an estimated overall maneuvering duration of the recommended deviation scheme. This computation may be facilitated, for example, by maneuvering analysis module 225.

Optionally, memory module 210 and the second computer program code may be configured with processor 220 to cause system 220 to compute the recommended deviation scheme to minimize deceleration of the marine vessel during the deviation maneuver. This computation may be facilitated, for example, by maneuvering analysis module 225.

Optionally, memory module 210 and the second computer program code may be configured with processor 220 to cause system 220 to compute the recommended deviation scheme in which an expected deceleration of the marine vessel is smaller than expected decelerations of any other at least one analyzed possible deviation maneuvering scheme having an estimated overall maneuvering duration shorter by up to 10% than an estimated overall maneuvering duration of the recommended deviation scheme. This computation may be facilitated, for example, by maneuvering analysis module 225.

Optionally, memory module 210 and the second computer program code may be configured with processor 220 to cause system 220 to cause the system to generate the recommended deviation scheme for the marine vessel at least four hours before a time of nearest distance between the marine vessel and the other maritime object. This computation may be facilitated, for example, by maneuvering analysis module 225.

Optionally, memory module 210 and the second computer program code may be configured with processor 220 to cause system 220 to trigger a deviation of the marine vessel based on the recommended deviation scheme, the deviation including modifying of direction of the marine vessel by at least 2° over less than 30 minutes. This triggering may be facilitated, for example, by ship controller module 226.

As aforementioned, system 200 and its different components may optionally be configured to execute method 500, method 600, and/or both methods 500 and 600. Many details that were discussed in detail with respect to method 500 and to method 600 are not repeated in the interest of concision. System 200, e.g., processor 220, may implement any variation, option, functionality, and capability discussed with respect to method 500, to method 600, and to any individual step of these methods. Likewise, system 200, e.g., processor 220, may implement any combination of any one or more of these variations, options, functionalities, and capabilities.

It is noted that the least one tangible memory module 210 or any other non-transitory computer-readable medium (the term encompassing any number of one or more computer readable media) may implement any one or more steps of method 500, any one or more steps of method 600, and/or any combination of one or more steps of each of methods 500 and 600. Many details that were discussed in detail with respect to method 500 and to method 600 are not repeated in the interest of concision. Such non-transitory computer-readable medium may implement any variation, option, functionality, and capability discussed with respect to method 500, to method 600, and to any individual step of these methods.

For example, a non-transitory computer-readable medium for fuel consumption management (also referred to as "the first non-transitory computer-readable medium", including instructions stored thereon, that when executed on a processor (e.g., processor 220), perform the steps of: (a) obtaining historic navigation data of a plurality of marine vessels, indicative of routes and accelerations in past voyages of each marine vessel out of the plurality of the marine vessels; (b) processing the historic navigation data to generate historic acceleration analysis data indicative of correlations between prevalence of acceleration events and event contextual criteria, the event contextual criteria including at least acceleration event location; (c) obtaining navigation data of a monitored marine vessel, indicative of a plurality of vessel acceleration events of the monitored marine vessel, the plurality of vessel acceleration events including at least a first vessel acceleration event and a second vessel acceleration event; (d) for each vessel acceleration event out of the plurality of vessel acceleration events: (i) obtaining event contextual criteria of the respective vessel acceleration event; and (ii) estimating acceleration divergence from historic acceleration behavior based on the event contextual criteria and on the historic acceleration analysis data; and (e) generating excess acceleration data for the monitored marine vessel based on the plurality of acceleration divergences estimated for the marine vessel, the excess acceleration data indicative of degree of excess acceleration of the monitored marine vessel at the plurality of vessel acceleration events.

Pertaining to the first non-transitory computer-readable medium, optionally the excess acceleration data may be indicative of estimated excess fuel usage by the monitored marine vessel.

Pertaining to the first non-transitory computer-readable medium, optionally all of the following may occur: the first vessel acceleration event may include deceleration of the monitored marine vessel at a first deceleration degree, the second vessel acceleration event may include deceleration of the monitored marine vessel at a second deceleration degree that is a greater deceleration degree than the first deceleration degree, the first vessel acceleration event may occur at a first location corresponding to first location criteria and the second vessel acceleration event may occur at a second location corresponding to second location criteria differing than the first location criteria. The first non-transitory computer-readable medium in such case may further include instructions stored thereon, that when executed on the processor, perform the steps of: (a) estimating substantial divergence from historic acceleration behavior for the first vessel acceleration event based on the first location criteria; and (b) estimating insubstantial divergence from historic acceleration behavior for the second vessel acceleration event based on the second location criteria.

Pertaining to the first non-transitory computer-readable medium, optionally the first location criteria may be indicative of the first vessel acceleration event occurring at open seas, with the second location criteria being indicative of the second vessel acceleration event occurring within 12 nautical miles from a seaport.

Pertaining to the first non-transitory computer-readable medium, optionally the first location criteria is indicative of the first vessel acceleration event occurring at open seas, and the second location criteria is indicative of the second vessel acceleration event meeting a predetermined seaport proximity criteria indicative of a degree of proximity of the first vessel acceleration event to a seaport.

Optionally, the first non-transitory computer-readable medium may further include instructions stored thereon, that when executed on the processor, perform the steps of: obtaining for at least one vessel acceleration event out of the plurality of vessel acceleration events the contextual criteria that is further indicative of congestion in a vicinity of the monitored marine vessel during the respective vessel acceleration event; and estimating the acceleration divergence further in response to the congestion.

Pertaining to the first non-transitory computer-readable medium, optionally the first vessel acceleration event may include deceleration of the monitored marine vessel at a first deceleration degree, with the second vessel acceleration event including deceleration of the monitored marine vessel at a second deceleration degree that is a greater deceleration degree than the first deceleration degree. The first non-transitory computer-readable medium in such case may further include instructions stored thereon, that when executed on the processor, perform the steps of: (a) estimating substantial divergence from historic acceleration behavior for the first vessel acceleration event and estimating insubstantial divergence from historic acceleration behavior for the second vessel acceleration event, based on the second vessel acceleration event occurring at a less congested sea scenario than the first vessel acceleration event.

Pertaining to the first non-transitory computer-readable medium, optionally the obtained historic navigation data may be further indicative of environmental statuses in different parts of the past voyages of the respective marine vessels determined based on environmental sensor data collected by at least one external environment monitoring sensor onboard the respective marine vessel, with the processing including generating the historic acceleration analysis data that is further indicative of correlation between prevalence of acceleration events and event contextual criteria including sensor based environmental statuses.

Optionally, the first non-transitory computer-readable medium may further include instructions stored thereon, that when executed on the processor, perform the steps of: obtaining for at least one vessel acceleration event out of the plurality of vessel acceleration events the contextual criteria that is further indicative of a safety event status of the monitored marine vessel during the respective vessel acceleration event; and estimating the acceleration divergence further in response to the safety event status.

Optionally, the first non-transitory computer-readable medium may further include instructions stored thereon, that when executed on the processor perform the steps of: estimating for the at least one vessel acceleration event optional divergence scenarios for the monitored marine vessel in view of at least the safety event status and assessing for the monitored marine vessel at least one of (a) the acceleration divergence and (b) excess fuel consumption, for the respective vessel acceleration event based on analysis of the optional divergence scenarios.

Optionally, the first non-transitory computer-readable medium may further include instructions stored thereon, that when executed on the processor perform the steps of: generating a recommendation for navigation of the monitored marine vessel based on the excess acceleration data.

Pertaining to the first non-transitory computer-readable medium, optionally the generating of recommendation is further based on location of the monitored marine vessel within up to an hour prior to the generating of the recommendation.

Pertaining to the first non-transitory computer-readable medium, optionally the generating of recommendation is further based on environmental sensor data collected by at least one external environment monitoring sensor onboard the monitored marine vessel within up to an hour prior to the generating of the recommendation.

Pertaining to the first non-transitory computer-readable medium, optionally the generating of recommendation is further based on safety event status of the monitored marine vessel within up to an hour prior to the generating of the recommendation.

For example, a non-transitory computer-readable medium for fuel consumption optimization (also referred to as "the second non-transitory computer-readable medium", including instructions stored thereon, that when executed on a processor (e.g., processor 220), perform the steps of: (a) obtaining safety information indicative of an increased likelihood for collision of the marine vessel with another maritime object; (b) processing current navigational data of the marine vessel—data that is indicative of expected progression of the marine vessel—in view of the safety information, to generate a set of possible deviation maneuvering schemes for the marine vessel with respect to the other maritime object which qualify a collision prevention safety criterion; (c) performing fuel consumption analysis for the set of possible deviation maneuvering schemes to assess fuel consumption in different possible deviation maneuvering schemes; and (d) computing a recommended deviation scheme for the marine vessel based on results of the fuel consumption analysis, to reduce fuel consumption of the marine vessel in maneuvering with respect to the other maritime object.

Pertaining to the second non-transitory computer-readable medium, optionally the computing of the recommended deviation scheme may include computing the recommended deviation scheme at least partly based on the recommended deviation scheme having a smaller fuel consumption estimate in the fuel consumption analysis than any analyzed possible deviation maneuvering scheme with shorter estimated overall maneuvering duration.

Pertaining to the second non-transitory computer-readable medium, optionally the computing of the recommended deviation scheme may include computing the recommended deviation scheme at least partly based on the recommended deviation scheme having a smaller fuel consumption estimate in the fuel consumption analysis than an alternative analyzed possible deviation maneuvering scheme with an estimated overall maneuvering duration shorter by at least 10% than an estimated overall maneuvering duration of the recommended deviation scheme.

Pertaining to the second non-transitory computer-readable medium, optionally the computing of the recommended deviation scheme may include computing the recommended deviation scheme to minimize deceleration of the marine vessel during the deviation maneuver.

Pertaining to the second non-transitory computer-readable medium, optionally the computing of the recommended deviation scheme may include computing the recommended deviation scheme in which an expected deceleration of the marine vessel is smaller than expected decelerations of any other at least one analyzed possible deviation maneuvering scheme having an estimated overall maneuvering duration shorter by up to 10% than an estimated overall maneuvering duration of the recommended deviation scheme.

Optionally, the second non-transitory computer-readable medium may further include instructions stored thereon, that when executed on the processor, performs reiterating at least thrice the steps of: processing current navigational data to generate a new set of possible deviation maneuvering schemes for the marine vessel; performing fuel consumption analysis for the new set of possible deviation maneuvering schemes and computing a new recommended deviation scheme for the marine vessel different than the recommended deviation scheme of the previous iteration to reduce fuel consumption of the marine vessel in maneuvering with respect to the other maritime object.

Optionally, the second non-transitory computer-readable medium may further include instructions stored thereon, that when executed on the processor, perform the steps of: triggering a deviation of the marine vessel based on the recommended deviation scheme, the deviation including modifying of direction of the marine vessel by at least 2° over less than 30 minutes.

It is noted that a single non-transitory computer-readable medium for fuel consumption management and optimization may incorporate any combination of any one or more of the instructions discussed above with respect to the first non-transitory computer-readable medium and to the second non-transitory computer-readable medium.

Any of the aforementioned computer programs, computer codes, etc. may be stored internally on a non-transitory computer readable medium. All or some of the computer programs, computer codes, etc. may be provided on computer readable media permanently, removably, or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

While the embodiments described above are provided as examples, it should be understood that various modifications and substitutions may be made without departing from the scope of the invention as defined in the appended claims.

What is claimed is:

1. A navigation system for a marine vessel, the system comprising:

at least one processor;

one or more onboard sensors and at least one memory module including computer program code, wherein the at least one memory and the computer program code are configured, with the at least one processor, to cause the system to at least:

continuously process data obtained from the one or more onboard sensors and informative of current state of the marine vessel and environment surrounding thereof to assess a likelihood of collision of the marine vessel with a moving maritime object;

responsive to obtaining an indication of increasing the likelihood, process navigational data indicative of expected progressions of the marine vessel and the moving maritime object to generate a set of possible generated deviation maneuvering schemes for the marine vessel with respect to the moving maritime object, the schemes matching a collision prevention safety criterion;

perform fuel consumption analysis for the set of possible generated deviation maneuvering schemes to assess fuel consumption in different possible generated deviation maneuvering schemes;

select from the set of possible generated deviation maneuvering schemes, a deviation scheme enabling reduced fuel consumption by minimizing expected deceleration of the marine vessel during a selected deviation maneuver, wherein selecting the deviation scheme comprises performing a constrained optimization that minimizes at least one of:

assessed fuel consumption such that the selected deviation maneuvering scheme has a lower assessed fuel consumption than another possible generated deviation maneuvering scheme whose estimated overall maneuvering duration is shorter by at least 10% than an estimated overall maneuvering duration of the selected deviation scheme; and expected deceleration such that the selected deviation maneuvering scheme has a lower expected deceleration than any other possible generated deviation maneuvering scheme whose estimated overall maneuvering duration is shorter than the estimated overall maneuvering duration of the selected deviation maneuvering scheme by up to 10%; and cause the system to trigger a deviation maneuver of the marine vessel based on the selected deviation scheme.

2. The system according to claim 1, wherein the at least one processor and the at least one memory module are located onboard the marine vessel.

3. The system according to claim 1, wherein the selected deviation scheme has smaller assessed fuel consumption than any of the possible generated deviation maneuvering scheme with shorter estimated overall maneuvering duration.

4. The system according to claim 1, wherein the at least one memory and the computer program code are configured, with the at least one processor, to cause the system to select the deviation scheme for the marine vessel at least four hours before time of the nearest distance between the marine vessel and the moving maritime object.

5. The system according to claim 1, wherein the deviation maneuver comprises modifying of direction of the marine vessel by at least 2° over less than 30 minutes.

6. A computer-implemented method of route navigation of a marine vessel, the method comprising:

continuously processing, by a computer, data informative of a current state of the marine vessel and an environment surrounding thereof to assess a likelihood of collision of the marine vessel with a moving maritime object, wherein at least part of said data is obtained by one or more on-board sensors;

responsive to obtaining an indication of increasing the likelihood, processing navigational data indicative of expected progressions of the marine vessel and the moving maritime object to generate a set of possible generated deviation maneuvering schemes for the marine vessel with respect to the moving maritime object, the schemes matching a collision prevention safety criterion;

performing, by the computer, fuel consumption analysis for the set of possible generated deviation maneuvering schemes to assess fuel consumption in different possible generated deviation maneuvering schemes;

selecting, by the computer from the set of possible generated deviation maneuvering schemes, a deviation scheme enabling reduced fuel consumption by minimizing expected deceleration of the marine vessel during a selected deviation maneuver, wherein selecting the deviation scheme comprises performing a constrained optimization that minimizes at least one of:

assessed fuel consumption such that the selected deviation maneuvering scheme has a lower assessed fuel consumption than another possible generated deviation maneuvering scheme whose estimated overall maneuvering duration is shorter by at least 10% than an estimated overall maneuvering duration of the selected deviation scheme; and expected deceleration such that the selected deviation maneuvering scheme has a lower expected deceleration than any other possible generated deviation maneuvering scheme whose estimated overall maneuvering duration is shorter than the estimated overall maneuvering duration of the selected deviation maneuvering scheme by up to 10%; and triggering a deviation maneuver of the marine vessel based on the selected deviation scheme.

7. The method according to claim 6, wherein the processing, generating, performing, and computing are executed onboard the marine vessel further in response to sensor data obtained from sensors installed on the marine vessel.

8. The method according to claim 6, further comprising reiterating at least thrice the steps of: processing current navigational data indicative of expected progressions of the marine vessel and the moving maritime object to generate a new set of possible generated deviation maneuvering schemes for the marine vessel with respect to the other moving maritime object; performing fuel consumption analysis for the new set of possible generated deviation maneuvering schemes and selecting from the new set of possible generated deviation maneuvering schemes, a deviation scheme enabling reduced fuel consumption and being different than the selected deviation scheme of the previous iteration.

9. The method according to claim 6, wherein the selecting of the deviation scheme for the marine vessel is executed at least four hours before a time of nearest distance between the marine vessel and the moving maritime object.

10. The method according to claim 6, wherein the deviation maneuver comprises modifying of direction of the marine vessel by at least 2° over less than 30 minutes.

11. A non-transitory computer-readable medium comprising instructions stored thereon, that when executed on a processor, cause the processor enable navigating a route of a marine vessel in accordance with a method comprising:

continuously processing, by a computer, data informative of a current state of the marine vessel and an environment surrounding thereof to assess a likelihood of collision of the marine vessel with a moving maritime object, wherein at least part of said data is obtained by one or more on-board sensors;

responsive to obtaining an indication of increasing the likelihood, processing navigational data indicative of expected progressions of the marine vessel maritime object to generate a set of possible generated deviation maneuvering schemes for the marine vessel with respect to the moving maritime object, the schemes matching a collision prevention safety criterion;

performing fuel consumption analysis for the set of possible generated deviation maneuvering schemes to assess fuel consumption in different possible generated deviation maneuvering schemes;

selecting from the set of possible generated deviation maneuvering schemes, a deviation scheme enabling reduced fuel consumption by minimizing expected deceleration of the marine vessel during a selected deviation maneuver, wherein selecting the deviation scheme comprises performing a constrained optimization that minimizes at least one of:

assessed fuel consumption such that the selected deviation maneuvering scheme has a lower assessed fuel consumption than another possible generated deviation maneuvering scheme whose estimated overall maneuvering duration is shorter by at least 10% than an estimated overall maneuvering duration of the selected deviation scheme; and expected deceleration such that the selected deviation maneuvering scheme has a lower expected deceleration than any other possible generated deviation maneuvering scheme whose estimated overall maneuvering duration is shorter than the estimated overall maneuvering duration of the selected deviation maneuvering scheme by up to 10%; and triggering a deviation maneuver of the marine vessel based on the selected deviation scheme.

12. The non-transitory computer-readable medium according to claim 11, wherein the selected deviation scheme has smaller assessed fuel consumption than any of the possible generated deviation maneuvering scheme with shorter estimated overall maneuvering duration.

13. The non-transitory computer-readable medium according to claim 11, further comprising instructions stored thereon, that when executed on the processor, perform reiterating at least thrice the steps of: processing current navigational data indicative of expected progressions of the marine vessel and the moving maritime object to generate a new set of possible generated deviation maneuvering schemes for the marine vessel; performing fuel consumption analysis for the new set of possible generated deviation maneuvering schemes and selecting from the new set of possible generated deviation maneuvering schemes, a deviation scheme enabling reduced fuel consumption and being different than the selected deviation scheme of the previous iteration.

14. The non-transitory computer-readable medium according to claim 11, wherein the deviation maneuver comprises modifying of direction of the marine vessel by at least 2° over less than 30 minutes.

* * * * *